United States Patent [19]

Murata

[11] Patent Number: 5,475,805
[45] Date of Patent: Dec. 12, 1995

[54] LAYOUT AND DISPLAY OF STRUCTURED DOCUMENT HAVING EMBEDDED ELEMENTS

[75] Inventor: Makoto Murata, Yokohama, Japan

[73] Assignee: Fuji Xerox Co., Inc., Japan

[21] Appl. No.: 416,451

[22] Filed: Apr. 3, 1995

Related U.S. Application Data

[63] Continuation of Ser. No. 925,394, Aug. 4, 1992, abandoned.

[30] Foreign Application Priority Data

Aug. 9, 1991 [JP] Japan .................................. 3-200988

[51] Int. Cl.$^6$ ................................................. G06F 15/04
[52] U.S. Cl. ................................................. 395/145
[58] Field of Search .................................. 395/144–149; 364/419.1, 419.19

[56] References Cited

U.S. PATENT DOCUMENTS

| | | | |
|---|---|---|---|
| 5,173,853 | 12/1992 | Kelly et al. | 395/148 |
| 5,179,650 | 1/1993 | Fukui et al. | 395/148 |
| 5,181,162 | 1/1993 | Smith et al. | 364/419.19 |
| 5,323,312 | 6/1994 | Saito et al. | 364/419.1 |
| 5,379,373 | 1/1995 | Hayashi et al. | 395/148 |

FOREIGN PATENT DOCUMENTS

| | | |
|---|---|---|
| 0349461 | 3/1990 | European Pat. Off. . |
| 9108538 | 6/1991 | WIPO . |

OTHER PUBLICATIONS

Ma, "New Tools to support ODA and ODIF", Computer Communications, 10 (1987) Feb., No. 1, pp. 15–20.
Golkar et al., "ODA activities at University College London", Computer Networks and ISDN, Systems, 21 (1991) 187–196.
Bormann et al., "Standards for open document processing: current state and future developments"; Computer Networks and ISDN Systems, 21 (1991) 149–163.
Brown, H., "Standards for Structured Documents", Computer Journal, 32 (1989) Dec., No. 6, pp. 505–514.
Hunter et al., "ODA: a document architecture for open systems", Computer Communications 12 (1989) Apr., No. 2, pp. 69–79.
Gruber, "Structures of an Integrated Document Workstation", Comput & Graphics II (1987) No. 4, pp. 377–387.
Ansen, "Document Architecture Standards Evolution," AT&T Tech. Journal 68 (1989) Jul./Aug., No. 4, pp. 33–44.
Molesworth, R., "The Open Interchange of Electronic Documents", IEE Colloquium on Stds. and Practices in Electronic Document Interchange, May, 1991, p. 4/1–6.
Cole, F., "Document Structures for Integrated Text and Graphics", IEE Colloquium on Emerging Office Technologies, Apr., 1988, p. 6/1–3.
Dengal, et al., "From Paper to Office Document Standard Representation", Computer 25 (1992) No. 7, pp. 63–67.
Furata, "Concepts and Models for Structured Documents", Structured Documents, Cambridge Press, pp. 7–25, 1989.
Furata et al., "Interactively Editing Structured Documents", Electronic Publishing, v. 1, n. 1, Apr. 1988, pp. 19–44.

*Primary Examiner*—Heather R. Herndon
*Assistant Examiner*—Joseph R. Burwell
*Attorney, Agent, or Firm*—Welsh & Katz, Ltd.

[57] ABSTRACT

A document processing system in which, when it is desired to lay out a document structure embedded in a content portion to be laid out, a content layout unit calls a document structure layout unit to embed in the content portion the document structure laid out by the called document structure layout unit, whereby layout processing of embedding a medium into another already embedded medium can be realized (for example, embedding a mathematical formula into a text in a graphic frame). Further, such data (layout of a boxed item) that is difficult to express in terms of content portion can be expressed in terms of document structures appearing in the middle of the processing.

9 Claims, 32 Drawing Sheets

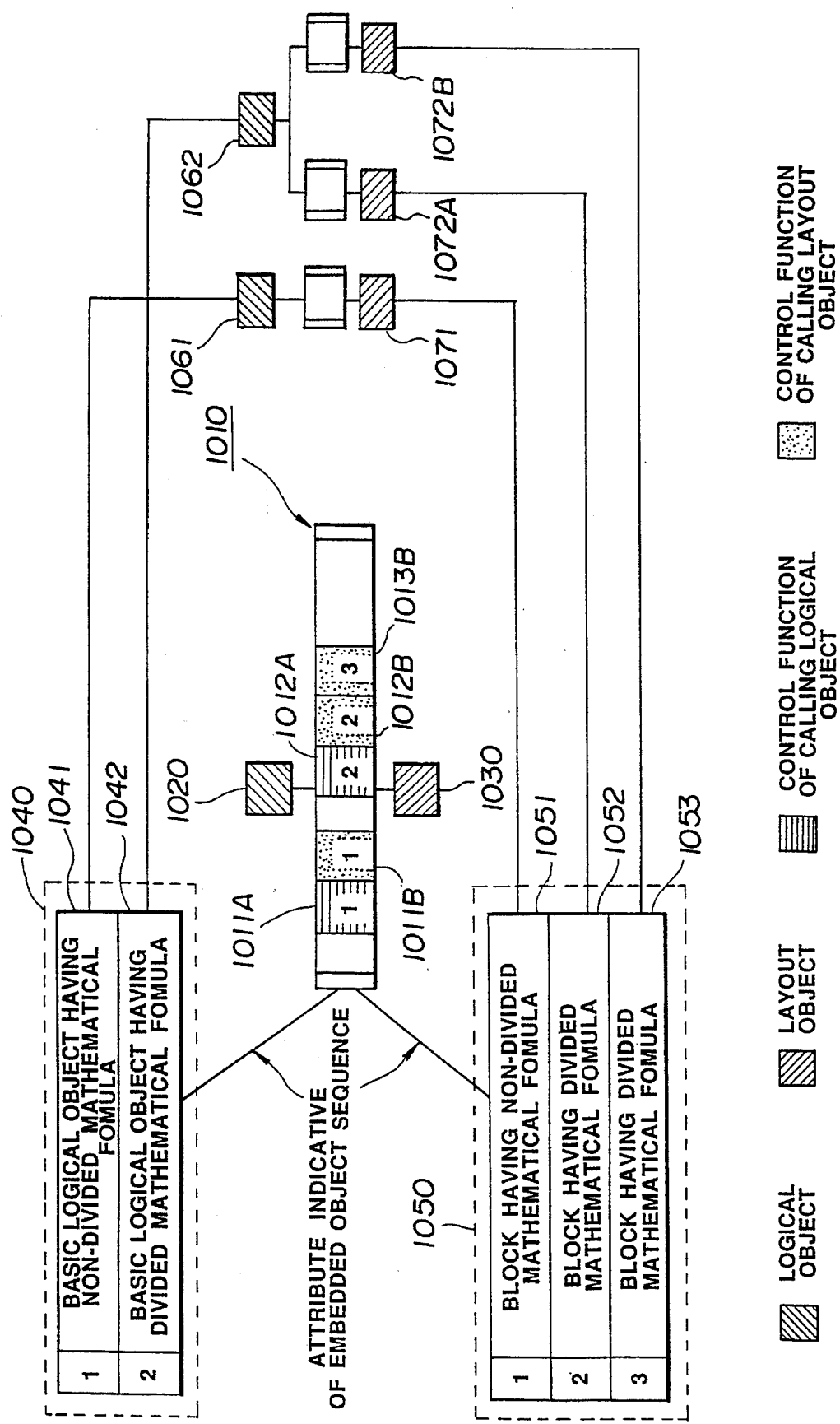

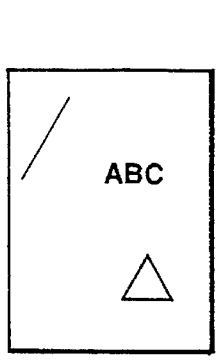 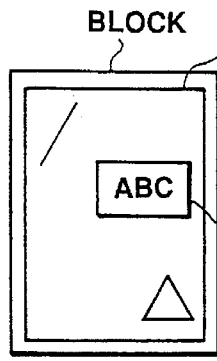 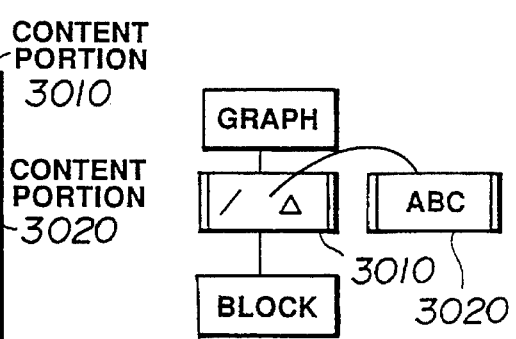
FIG.30(a) (PRIOR ART)  FIG.30(b) (PRIOR ART)  FIG.30(c) (PRIOR ART)
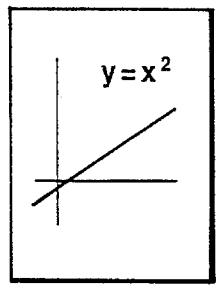 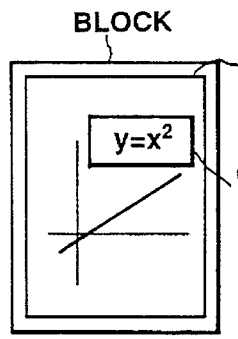 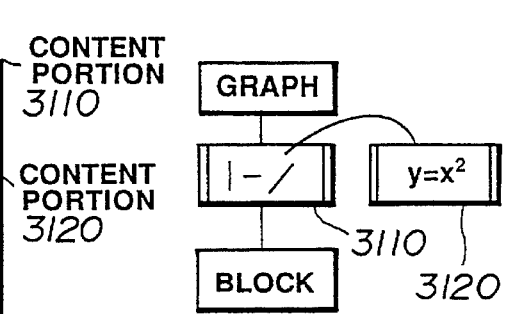
FIG.31(a) (PRIOR ART)  FIG.31(b) (PRIOR ART)  FIG.31(c) (PRIOR ART)
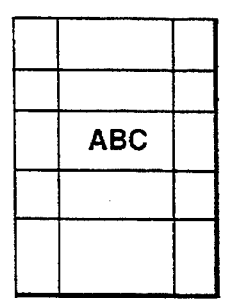 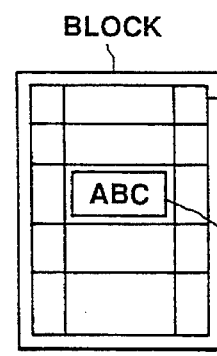 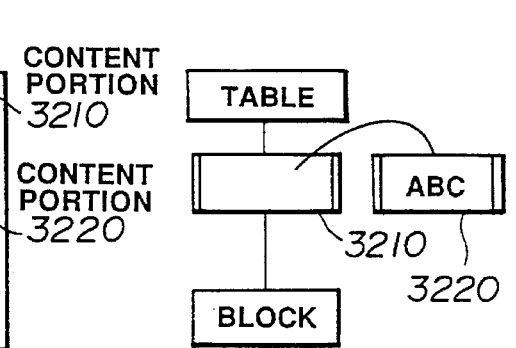
FIG.32(a) (PRIOR ART)  FIG.32(b) (PRIOR ART)  FIG.32(c) (PRIOR ART)

LAYOUT AND DISPLAY OF STRUCTURED DOCUMENT HAVING EMBEDDED ELEMENTS

This is a continuation of application Ser. No. 07/925,394, filed Aug. 4, 1992, now abandoned.

BACKGROUND OF THE INVENTION

1. Field of the Invention

The present invention relates to document processing systems which carry out word processing and more particularly, to a document processing system capable of layout and display of such media as bit maps, graphic symbols, tables and formulas.

2. Description of the Related Art

Document editors operated on computer have been widely used so far in offices and homes. These years, it has been demanded for the document editors to edit not merely text documents but also hybrid or multi-media documents containing a mixture of texts, bit maps, graphic symbols, etc. Such conventional document editors allowing the editing of multi-media have been widely used. Documents to be edited by such editors comprise a medium content portion indicative of the data of media and a document structure portion indicative of data (such as pages, columns, rectangular regions in the columns, paragraphs and chapters) other than the media part. For example, as such document, there is a document which is based on the Office Document Architecture of International Organization for Standardization (ISO8613:1989, Information Processing—Text and Office Systems-Office Document Architecture (ODA) and Interchange Format)(which will be sometimes referred to as the ODA). For example, such a document as shown in FIG. 25 has such a layout structure as shown in FIG. 26. That is, in FIG. 26, a page 2600 has an all-column frame 2601 indicative of an all-column area and left and right column frames 2602. Each of the all-column frame 2601 and column frames 2602 further contains two blocks 2603. A relationship between the logical structure, layout structure and content portion of the document of FIG. 25 is shown in FIG. 27. In the drawing, a logical structure A includes logical objects indicative of a title, an author name, a heading, a paragraph and a graph, respectively. In FIG. 27, a layout structure B is a nested structure in which the page, frames and blocks are nested as shown in FIG. 26. Further, a content portion C is referred to by the logical and layout structures.

Document display and layout processing are carried out through the display and layout of the document structure and the display and layout of the content portion. In more detail, the display and layout of the document structure are realized by sequentially processing the respective objects of the document structure and for ones of the objects having their content portions, by calling the display and layout processing of the content portions. On the other hand, the display and layout of the content portion are realized by sequentially processing the respective elements of the content portion. The word 'elements' as used herein refers to characters for a text, pixels for a bit map and graphic primitives such as lines/circles for graphics.

A flow of the display and layout processing of the document structure will be briefly explained by referring to a flowchart of FIG. 28.

More specifically, it is judged whether or not an object not processed yet is present in the document logical and layout structures (step 2801).

The presence of an object not processed causes the object in question to be extracted (step 2802) and be subjected to a predetermined processing (step 2803). For example, display processing includes positioning, while layout processing includes interpretation of layout control data.

Judgement is next made at a step 2804 as to whether or not the object extracted at the step 2802 has a content portion. The possession of the content portion causes the content display and layout processing to be called with respect to the content portion (step 2805) to perform the content display and layout processing. After completion of the step 2805, the system returns to the step 2801 to again execute the step 2801 and the subsequent steps. When no possession of the content portion is judged at the step 2804, the system also returns to the step 2801.

When necessary processing is completed at the step 2801 over all the objects in the document logical and layout structures, this processing ends.

Brief explanation will next be made as to a flow of the content display and layout processing called at the step 2805 by referring to a flowchart of FIG. 29.

First of all, it is judged whether or not the next element is present in the content portion (step 2901). The presence of the next element causes the element to be extracted (step 2902) and be subjected to its necessary processing (step 2908). For displaying, for example, the element is displayed: whereas, for layout processing, calculation is carried out to find a necessary space for the element.

Meanwhile, a multi-media document not only contains multiple media but also it is required to embed such media. More particularly, it is required to embed the content portion of a medium into the content portion of another medium. Examples of embedding a medium include embedding a text, a mathematical formula and/or a graph into a table and embedding a text, a mathematical formula and/or a table into a graph.

In the processing based on such a processing procedure as shown in FIGS. 28 and 29, however, since the content portion is limited to the content of one form of medium, it is impossible to embed another medium into the medium of the content portion.

For the purpose of realizing the embedding of another medium, such extension as to embed one content portion directly into another content portion has been proposed. More specifically:

(1) In order to embed a text into a graph as shown in FIG. 30(a), a content portion 3020 for the character text is directly embedded into a content portion 3010 for the graph as shown in FIGS. 30(b) and 30(c).

(2) In order to embed a mathematical formula into a graph as shown in FIG. 31(a), a content portion 3120 for the mathematical formula is directly embedded into a content portion 3110 for the graph as shown in FIGS. (31(b) and 31(c).

(3) In order to embed a text into a table as shown in FIG. 32(a), a content portion 3220 for the character text is directly embedded into a content portion 3210 for the table as shown in FIGS. 32(b) and 32(c).

With a document generating system based on the aforementioned ODA, in the above processing (1) and (2), the text is introduced into the graph as a graphic primitive in the content portion of the graph (more accurately, the text based on Computer Graphics Metafile (CGM) of the ODA is introduced) in order to embed a text into a graph. FIG. 33 is a flowchart for explaining a procedure of the content display and layout processing allowing calling of the display and layout of one content portion from the display and layout of another content portion. Brief explanation will then be made as to the flow of the content display and layout processing, with reference to the processing procedure of FIG. 33.

It is judged whether or not the next element is present in the content portion (step 3301). The presence of the next element causes the element to be extracted (step 3302), and it is judged whether or not the element is an embedded content portion (step 3303). Judgement of no next element at the step 3301 causes the system to be terminated.

When it is judged at the step 3303 that the element belongs to an embedded content portion, the content display and layout processing is called (step 3304) to perform the display and layout processing over the element. When it is judged at the step 3303 that the element is not an embedded content portion, on the other hand, the system performs processing (such as display processing of the element for display or calculation of its necessary space for layout processing) over the element extracted at the step 3302 (step 3305). When the step 3304 or 3305 is completed, the system returns to the step 3301 to again execute the step 3301 and subsequent steps.

However, the content display and layout system based on the flowchart of Fla. 33 (refer to FIGS. 30 to 32 for its specific medium embedding examples) has a problem that only when all of the combinations of calling of the display and layout processing for different forms of media are implemented, such medium embedding can be realized. Suppose now that there are 6 different sorts of media, that is, text, bit map, drawing, mathematical formula, table and graph. Then 6×6 combinations of calling of the display processing and 6×6 combinations of calling of the layout processing must be implemented. In addition, even when a new form of medium is added, such combinations corresponding to the new medium must be increased. For example, assume that, in addition to the above 6 forms of media, spreadsheet is added as a new medium. Then a total of 13 calling combinations must be added, that is, a sum of 7 combinations of calling of the display and layout processing of the above 6 media from the display and layout processing of the spreadsheet as well as 6 combinations of calling of the display and layout processing of the spreadsheet from the display and layout processing of the 6 media. Furthermore, even with respect to the editing operation for medium embedding, it is required to implement many combinations. In the above example, 36 embedding operations must be implemented.

With the prior art document generating system, since all of such combinations of calling the display and layout processing as mentioned above are not implemented, such medium embedding has not been fully achieved in actual situations. Further, the realization of embedding a medium into an embedded medium has not been practically achieved. More specifically, such combinations as to embed a mathematical formula further into a text in a graphic frame has not been realized so far.

Further, user interfaces for the embedding operation are not integrally defined necessarily. For example, in the case of a workstation (which is named "JStar", and available from Fuji Xerox Ltd.), embedding of the content portion of a text into the content portion of a graph (graphic frame) requires insertion of a frame (text frame) indicative of the text under a TRANSCRIBE command: while insertion of a text into a table (table frame) merely requires insertion of the character text (but another medium cannot be inserted). In this way, embedding operations are not uniformly defined necessarily. Such an unification in the user interfaces has led to the fact that it takes for a user to a lot of time to master its manipulation.

Furthermore, since a content portion is embedded directly into another content portion, it becomes difficult to describe such data as to be suitably expressed in terms of document structure. When such data is described in a content portion, this requires the content layout and display processing to become complicated, thus resulting in reduction of its processing efficiency.

Consider such a document having a boxed item as shown in FIG. 34, for example. The document has two left and right columns in its upper part and a boxed item 3400 in its lower part. The boxed item 3400, which is surrounded by a decorated ruled line, has 3 columns 3401, 3402 and 3403 and a 2-column graph 3404 (covering a 2-column range). In general, a boxed item, which has a plurality of columns and a plural-column graphic block, is similar in property to a page face. (In this sense, a boxed item is also known as a small set.) Since the decorated ruled line surrounding the boxed item is expressed as a graphic content portion, the body of the boxed item must be embedded into a graphic content portion. Accordingly, a boxed item is expressed in terms of a content portion or portions embedded into another content portion. In other words, in the case of such a boxed item 3400 as shown in FIG. 34, 3 character content portions 3501, 3502 and 3503 indicative of columns respectively and a graphic content portion 3504 indicative of a graph are embedded into a graphic content portion 3505 indicative of a decorated ruled line, as shown in FIG. 35. In this connection, the character content portion 3501 corresponds to the content of the column 8401 in FIG. 34, the character content portion 3502 corresponds to the content of the column 3402 in FIG. 34, the character content portion 3503 corresponds to the content of the column 3403 in FIG. 34, and the graphic content portion 3504 corresponds to the 2-column graph 3404 in FIG. 34, respectively.

The boxed item, though it has a similar property to a page face, is expressed in terms of not a document structure but a content portion. Further, layout processing of the page face is realized by means of document structure layout processing, but layout processing of the boxed item is realized by means of graphic content layout processing.

Therefore, character moving operation among columns, when the size of the graph is changed, is realized or implemented with respect to the page face, but cannot be applied to the layout processing within the boxed item. The implementation of a function equivalent to the character moving operation among columns at the time of the graph size change means that the implementation with the document structure layout processing is again implemented with the content layout processing, which results in that the processing becomes complicated. In addition, even when a page face having a layout similar to a boxed item to be prepared is already present, the user must specify the layout processing of the boxed item from the beginning with a very low editing efficiency.

In this way, in such a prior art layout system as mentioned above, it is impossible to embed a medium into an already-embedded medium and only when all combinations of calling the display and layout processing for every medium form are implemented, medium embedding can be realized. In other words, the medium embedding is individually realized, so that embedding of some form of medium cannot be realized or editing operation is not uniformly defined in actual situations.

Further, since a content portion is embedded directly into another content portion, it is hard to express such information as to be suitably expressed in terms of document structure. In addition, when such information as mentioned above is expressed in terms of content portion, the content layout and display processing become complicated and its processing efficiency is reduced.

SUMMARY OF THE INVENTION

It is an object of the present invention to provide a document processing system which can realize the uniform medium embedding and the combined medium embedding and also can improve the processing efficiency of the layout and display processing.

Other objects and advantages of the present invention will be obvious upon reading the following detailed explanation of the present invention with reference to the accompanying drawings.

In accordance with an aspect of the present invention, the above object is attained by providing a document processing system which comprises a document structure managing unit for managing a document structure to be referred to by a content portion as a constituent element of a document content, a content portion managing unit for managing the content portion holding therein reference data to the document structure, a document structure layout unit for layouting the document structure being managed by the document structure managing unit, and a content layout unit for layouting the content portion being managed by the content portion managing unit.

In the document processing system of the present invention, when it is desired to layout the document structure in a content portion which holds therein reference data to the document structure and which is managed by the content portion managing unit, the content layout unit calls the document structure layout unit to embed in the content portion the document structure laid-out by the called document structure layout unit, whereby layout processing of embedding a medium into another already embedded medium can be realized (for example, embedding a mathematical formula into a text in a graphic frame). Further, such data (layout of a boxed item) that is difficult to express in terms of content portion can be expressed in terms of document structures appearing in the middle of the processing.

In accordance with another aspect of the present invention, there is provided a document processing system which comprises a document structure managing unit for managing a document structure to be referred to by a content portion as a constituent element of a document content, a content portion managing unit for managing the content portion holding therein reference data to the document structure, a document structure display unit for displaying the document structure being managed by the document structure managing unit, and content display unit for displaying the content portion being managed by the content portion managing unit.

In the document processing system of the present invention, when it is desired to display the document structure in the content portion which holds therein reference data to the document structure and which is managed by the content portion managing unit, the content display unit calls the document structure display unit to display the document structure displayed by the called document structure display unit, whereby display of a medium embedded into another already embedded medium can be realized (for example, display of a mathematical formula embedded into a text in a graphic frame). Further, such data (layout of a boxed item) that is difficult to express in terms of content portion can be expressed in terms of document structures appearing in the middle of the processing.

BRIEF DESCRIPTION OF THE DRAWINGS

FIG. 10 is a diagram showing a relationship between logical and layout structures in the example of FIG. 9;

FIGS. 30(a)–(c) show diagrams for explaining how a text is embedded into a graph in the prior art;

FIGS. 31(a)–(c) show diagrams for explaining how a mathematical formula is embedded into a graph in the prior art;

FIGS. 32(a)–(c) show diagrams for explaining how a text is embedded into a table in the prior art;

DESCRIPTION OF THE PREFERRED EMBODIMENTS

Embodiments of the present invention will be explained in the foregoing with reference to the accompanying drawings.

Figure 1:
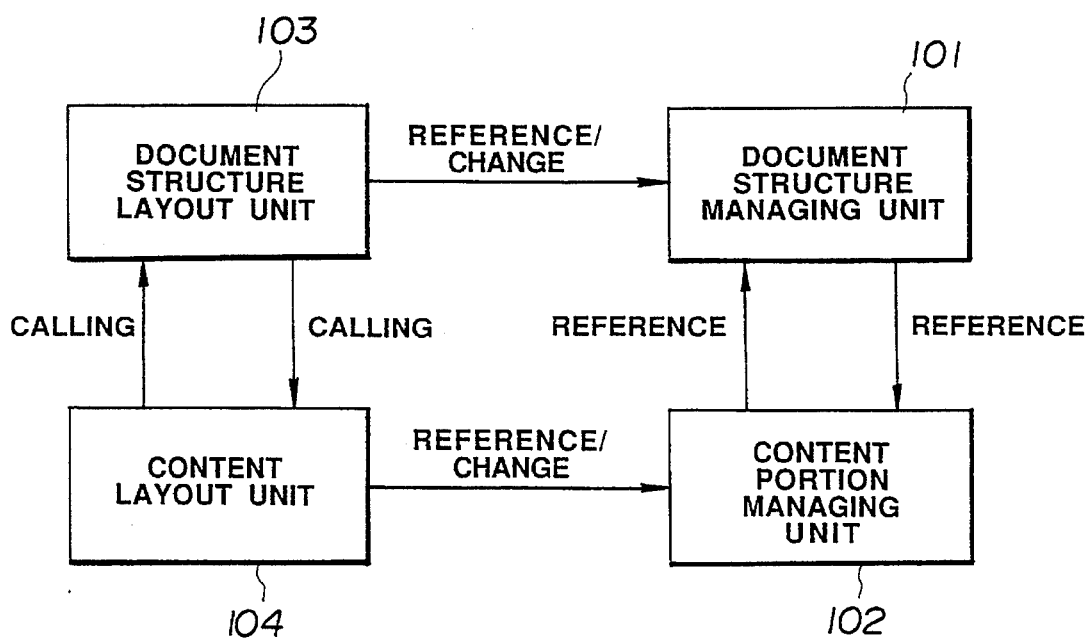
FIG. 1 is a functional block diagram of a document processing system in accordance with a first embodiment of the present invention.

A first embodiment of the present invention will be explained by referring to FIGS. 1 to 10. Referring first to FIG. 1, there is shown a functional block diagram of a document processing system in accordance with the first embodiment of the present invention. The illustrated system of the embodiment is applied to document processing systems based on the earlier-mentioned ODA and more particularly, to workstations and computers.

In the drawing, the document processing system includes a document structure managing unit 101, a content portion managing unit 102, a document structure layout unit 108 and a content layout unit 104.

The document structure managing unit 101 manages logical and layout structures in a document. A basic logical object at a terminal end of the logical structure and a block at a terminal end of the layout structure have each reference data to a content portion under management of the content portion managing unit 102. The document structure managing unit 101 stores therein logical and layout structures in the document referred to by the content portion. For the purpose of making distinctions between the document logical and layout structures and logical and layout structures referred to by the content portion, the logical and layout structures referred to by the content portion are called the partial logical and partial layout structures respectively, which are generally called the partial document structures, herein.

The content portion managing unit 102 manages content portions (content portion) in a document. The content portions are referred to by basic objects and blocks under management of the document structure managing unit 101. The content portion is different from that of the prior art in that the content portion can hold reference data to the partial document structures under management of the document structure managing unit 101, which will be detailed later.

The document structure layout unit 103 arranges or lays out the logical structures to create layout structures under management of the document structure managing unit 101 and stores the created results in the document structure managing unit 101. When basic logical objects are to be arranged or laid out, the content layout unit 104 is called for content portions possessed by the corresponding basic logical objects.

The content layout unit 104 lays out content portions being managed by the content portion managing unit 102. The content portions are of 'Processable Document Architecture' or 'Formatted Processable Document Architecture' based on the aforementioned ODA before the layout processing is carried out: while the content portions are of 'Formatted Document Architecture' or 'Formatted Processable Document Architecture' based on the ODA after the layout processing is carried out.

In the illustrated embodiment, the document structure managing unit 101 and the content portion managing unit 102 are implemented in the form of such a memory as a hard disk or a main memory: while the document structure layout unit 103 and content layout unit 104 are implemented by executing software (program) for performing the functions of the respective layout units by means of such a controller as a processor or a central processing unit. It goes without saying that the respective layout units may be realized in the form of hardware or firmware.

Explanation will next be made as to the content portion holding reference data to the partial document structures under control of the document structure managing unit 101.

The content portion has attributes indicative of an embedded object sequence which includes an attribute indicative of a logical object sequence and an attribute indicative of a layout object sequence. As the values of these attributes, data indicative of a pointer sequence to the logical objects being managed by the document structure managing unit 101 and data indicative of a pointer sequence to the layout objects are set. The attribute indicative of the logical object sequence can be specified with respect to content portions of a layoutable form (Processable Document Architecture or Formatted Processable Document Architecture). On the other hand, the attribute indicative of the layout object sequence is held with respect to content portions of a displayable form (Formatted Document Architecture or Formatted Processable Document Architecture).

The content portion holds a control function of calling an object. The control functions are classified into two forms of calling a logical object and calling a layout object. The former control function appears in the content portion of a layoutable form (corresponding to the processable document architecture or formatted processable document architecture in the ODA), while the latter control function appears in the content portion of a displayable form (corresponding to the formatted document architecture or formatted processable document architecture in the ODA). Each of the control functions has a natural number as one parameter. When the value of the parameter is a natural number N, an N-th element in the object sequence specified by the attribute indicative of the embedded object sequence is called. With respect to a character content portion, its control function is expressed in the form of a specific byte string in the character content portion. With respect to a graphic content portion, its control function is expressed in the form of graphics primitives like lines or circles.

Figure 2:
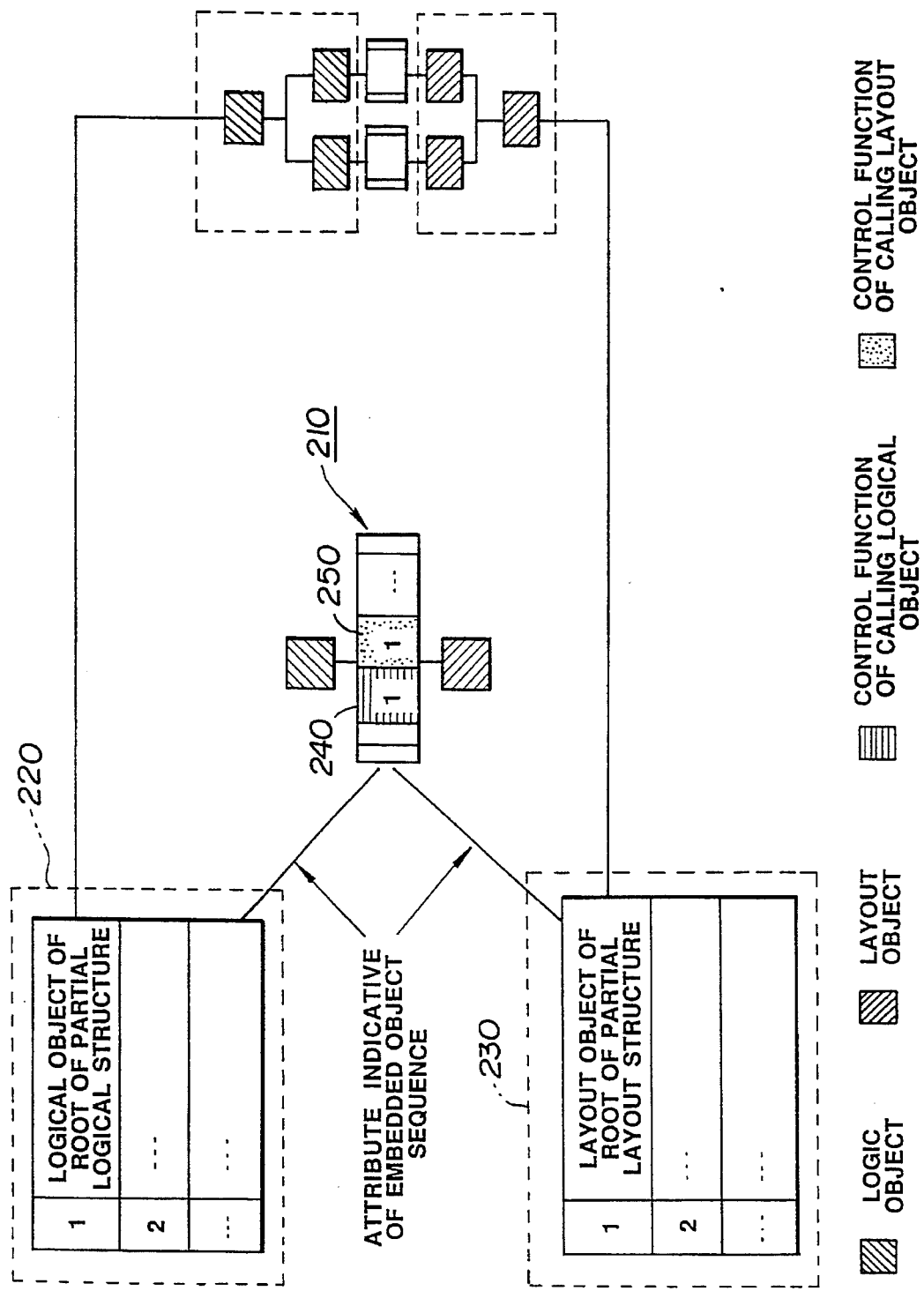
FIG. 2 is a diagram for explaining a content portion to be managed by content portion managing unit in the first embodiment.

FIG. 2 shows how the attribute indicative of the object sequence and the control function of calling an object are specified.

As shown in FIG. 2, a content portion 210 is specified by an attribute 220 indicative of a logical object sequence, an attribute 230 a layout object sequence, a control function 240 of calling a logical object, and a control function 250 of calling a layout object. Since the value of the parameter of the control function 240 is specified to be "1", the logical object corresponding to the first element in the logical object sequence of the attribute 220 (pointer sequence to the logical objects) is called. Similarly, since the value "1" is set in the parameter of the control function 250, the layout object corresponding to the first element in the layout object sequence of the attribute 230 (pointer sequence to the layout objects) is called.

With the aforementioned arrangement, a brief explanation will next be made as to the content layout processing of the content layout unit 104 in the document processing system.

The content layout unit 104 judges whether or not there is the next element in the content portion (step 301). The absence of the next element causes the processing to be terminated; while the presence of the next element causes the next element to be extracted (step 302). It is judged at a step 303 whether or not the extracted element is an embedded partial logical structure.

Determination of the next element to be a partial logical structure at the step 303 causes the content layout unit 104 to call the document structure layout unit 103 (document structure layout processing) with respect to the embedded partial logical structure (step 304) to request layout of the partial logical structure.

Meanwhile, it is determined at the step 303 that the extracted element is not a partial logical structure, the content layout unit 104 performs predetermined processing (such as calculation of a necessary space (step 305)) over the element.

The completion of the step 304 or 305 causes the content layout unit 104 to return to the step 301 and execute the step 303 and subsequent steps.

Explanation will next be made as to how to call the document structure layout unit 103 from the content layout unit 104.

The content layout unit 104, when finding the function (control function) of calling a logical object in the course of the content layout processing, calls the document structure layout unit 108 with respect to the partial logical structure. The details of the calling will be explained by referring to a flowchart of FIG. 4.

That is, the content layout unit 104 extracts one pointer specified by the parameter of the control function from among the pointer sequence to the logical object, which are held by the attributes indicative of the logical object sequence to specify the logical object (step 401). The content layout unit 104 then calculates an empty space remaining in the content portion currently being laid out (step 402). For example, when the layout processing is carried out for character content, the content layout unit 104 calculates a space left for the current line. When the layout processing is carried out for table, for example, the content layout unit 104 calculates a space left for the current entry.

Next, the content layout unit 104 judges whether or not all the remaining partial logical structures to be laid out can be laid out to the empty space calculated at the step 402 (step 403).

In the above judgement, the content layout unit 104 calls the document structure layout unit 103 to request the unit 103 to judge whether or not all the remaining partial logical structures to be laid out can be laid out to the empty space.

The document structure layout unit 103 called by the content layout unit 104 executes its document structure layout processing to allocate the logical object specified at the step 401 to the empty space calculated at the step 402. The result of layout is returned to the content layout unit 104 as a return value.

And the content layout unit 104 judges on the basis of the return value (layouted result) received from the document structure layout unit 103, whether or not all the remaining partial logical structures to be laid out can be laid out to the empty space.

The determination of the content layout unit 104 to be layoutable causes the content layout unit 104 to again call the document structure layout unit 103. And the called document structure layout unit 103 laid out the remaining partial logical structures to the empty space to generate layout objects (step 404).

Meanwhile, when determining that the layout processing is impossible, the content layout unit 104 judges whether or not the partial logical structure is dividable (step 405). Even in the judgement, the content layout unit 104 calls the document structure layout unit 103 to request the unit 103 to judge whether or not the partial logical structure is dividable. Since the judgement result of the document structure layout unit 103 is sent to the content layout unit 104, the content layout unit 104 judges on the basis of the judgement result received from the document structure layout unit 103 whether or not the partial logical structure is dividable.

When determining that the partial logical structure is dividable, the content layout unit 104 divides the partial logical structure into divisions and allocate allocatable ones of the divisions to the empty space calculated at the step 402 to generate logical objects (step 406). Even in the processing, the content layout unit 104 calls the document structure layout unit 103 to ask the unit 103 to perform its layout processing. That is, the document structure layout unit 103 divides the partial logical structure into divisions and allocates allocatable ones of the divisions to the empty space to generate layout objects.

Now explanation will be made in connection with several specific examples. First, suppose that the partial logical structure is a basic logical object which content portion has only a mathematical formula. Then the mathematical formula can be divided into several divisions at its points (e.g., at the end of "the sign of equality"). When the entire mathematical formula can be allocated to a given space, the formula is allocated thereto to generate a block having a mathematical formula content portion of a formatted form. However, when only part of the formula can be allocated to the space, the formula is divided into divisions and allocatable ones of the divisions are allocated thereto.

Assume that the partial logical structure is a basic logical object whose content portion has only characters. Then the character content portion can be divided. If the entire character content portion can be allocated to a given space, then the content portion is allocated thereto. When only part of the character content portion can be allocated to the space, the character content portion is divided into divisions and allocatable divisions alone are allocated thereto.

Assume that the partial logical structure is a basic logical object which content portion has graphics (geometric graphics contents in the ODA). Then, the graphic content portion cannot be divided. When the entire graphic content portion can be allocated to a given space, the graphic content portion is allocated thereto to generate a block having a graphic content portion of the formatted form.

Figure 4:
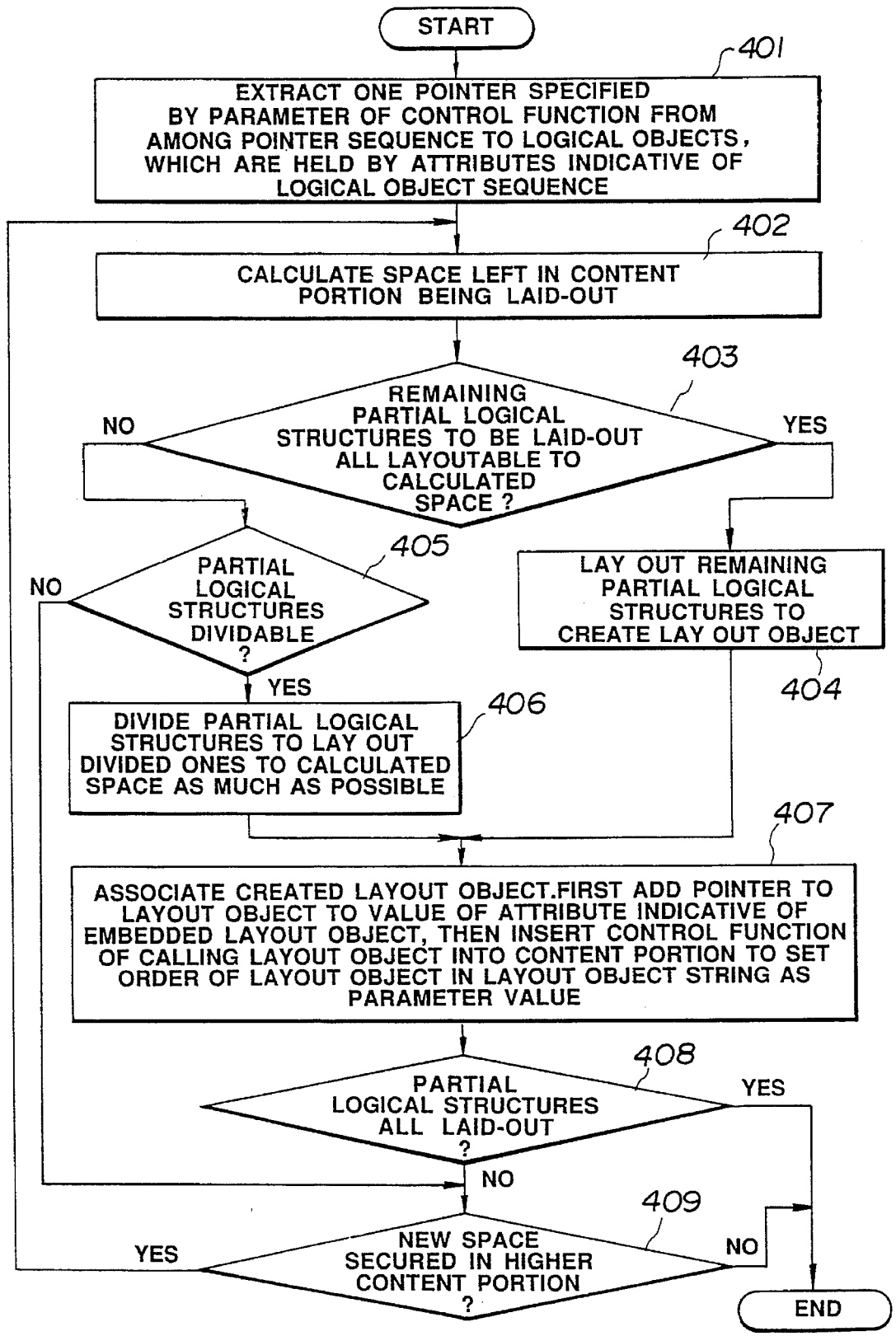
FIG. 4 is a flowchart for explaining the detailed operation of the content layout processing in the first embodiment.

Meanwhile, the content layout unit 104, when finishing the step 404 or 406, the layout object generated at the step 404 or 406 is connected to the content portion, as shown in FIG. 4 (step 407). In connecting the layout object to its content portion, a pointer to the generated layout object is added to the value of the attribute indicative of the embedded layout object sequence. Next, the control function of calling the generated layout object is inserted into the content portion so that when the generated layout object corresponds to the N-th in the layout object sequence, the parameter value of the control function is set to be N.

Next, the content layout unit 104 judges whether or not all the partial logical structures are already laid out (step 408). When determining that all the partial logical structures are already laid out, the content layout unit 104 terminates its processing; while when determining that all the partial logical structures are not laid out, the unit judges whether or not a new space can be secured in an upper-level content portion (step 409). In the step 409, when a new space can be secured, the content layout unit 104 returns to the step 402 and executes the step 402 and subsequent steps: whereas, when a new space cannot be secured, the unit 104 terminates its processing.

In this connection, when the upper-level content portion is a character content portion as an example, the content layout unit 104 generates a new line (e.g., one line) to secure a space and thereafter returns to the step 402. When the upper-level content portion is a table content portion as another example, the content layout unit 104 cannot allocate it to another entry and thus does not secure a space and terminates its processing. When the upper-level content portion is a graphic content portion as yet another example, the content layout unit 104 cannot secure a new space and thus terminates its processing.

When determining at the step 405 that the partial logical structure cannot be divided, the content layout unit 104 goes to the step 409.

In this connection, when the entire graphic content portion can be laid on to a given space as mentioned above, the content layout unit 409 allocates the content portion thereto and generates a block having a graphic content portion of the formatted form. When determining at the step 405 that the space is insufficient, that is, the entire graphic content portion cannot be allocated thereto, the content layout unit 104 proceeds to the step 409.

The layout processing will then be explained in connection with specific examples.

When a Mathematical Formula/text is Embedded into a Graphic Frame

Figure 5A:
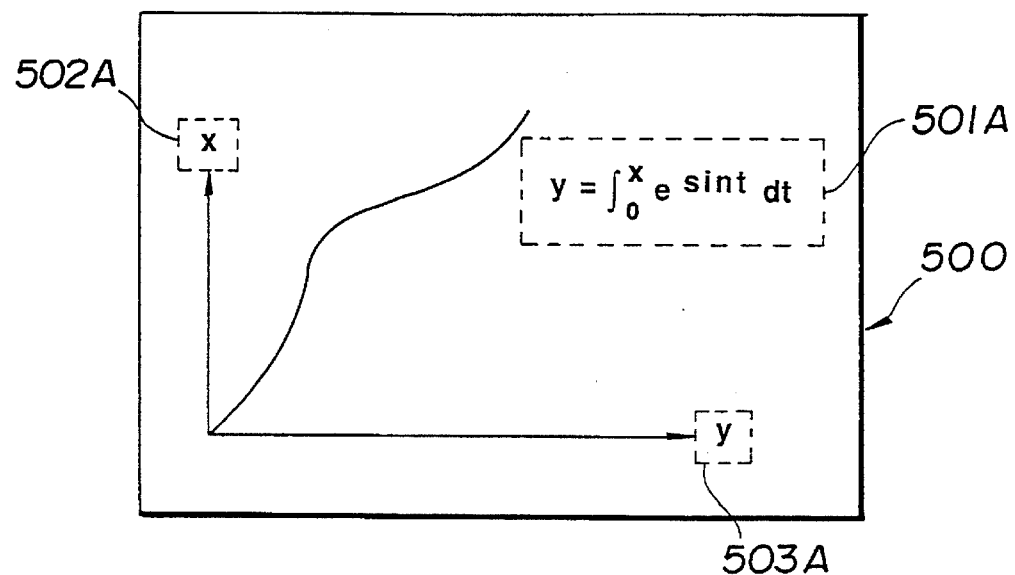
FIGS. 5(a)–(b) show diagrams for explaining how a mathematical formula and texts are embedded in a graphic frame in the first embodiment.
Figure 5B:
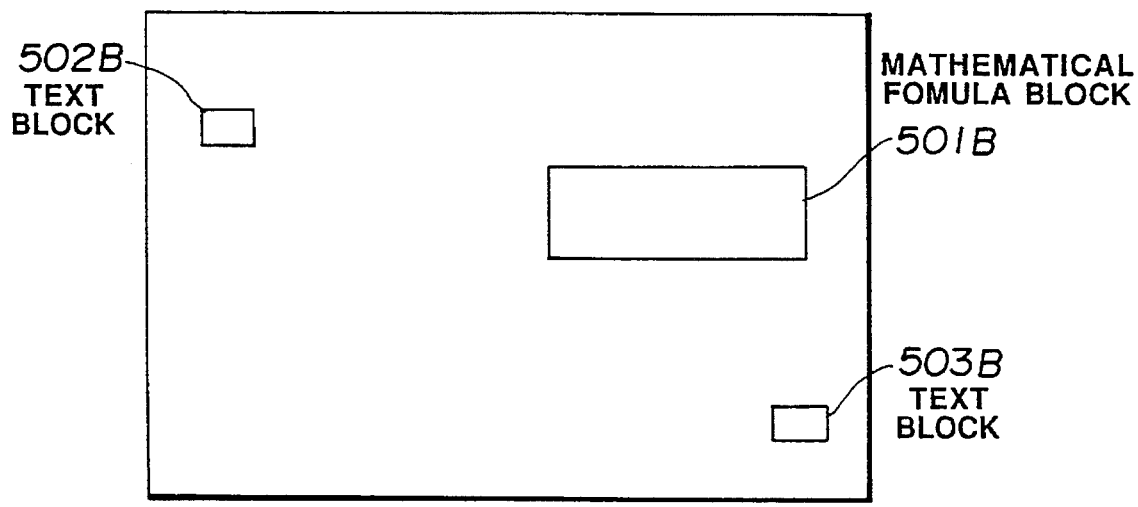

FIG. 5(a) shows the display image of a graphic content when a mathematical formula 501A and texts 502A and 503A are embedded into a graphic frame 500. FIG. 5(b) diagrammatically shows zones occupied by the mathematical formula and text layout objects. In FIG. 5(b), reference symbol 501B denotes a mathematical formula block, and 502B and 503B denote text blocks respectively. The mathematical formula block 501B corresponds to the mathematical formula 501A, the text block 502B corresponds to the text 502A, and the text block 503B corresponds to the text 503A. A relationship between logical and layout structures for obtaining such contents as shown in FIG. 5(a) is shown in FIG. 6.

Figure 6:
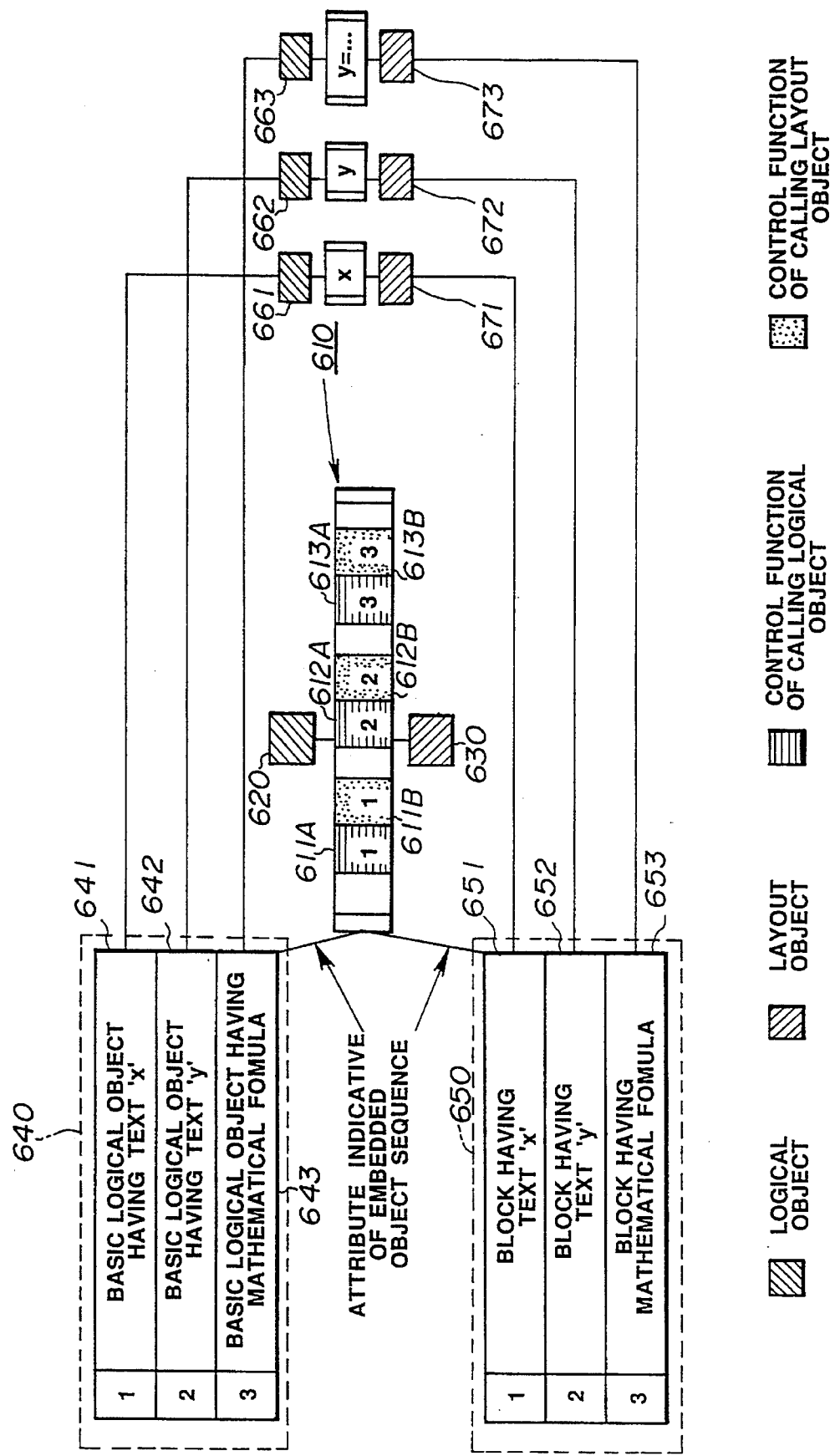
FIG. 6 is a diagram showing a relationship between logical and layout structures in the example of FIG. 5.

In the example of FIG. 6, with respect to a basic logical object 620 having a graphic content portion 610, a block 630 having the graphic content portion 610 is generated. The graphic content portion 610 contains a control function 611A having a parameter value "1" set therein, a control function 612A having a parameter value "2" set therein, a control function 613A having a parameter value "3" set therein, a control function 611B having a parameter value "1" set therein, a control function 612B having a parameter value "2" set therein, a control function 613B having a parameter value "3" set therein, an attribute 640 indicative of a logical object sequence, and an attribute 650 indicative of a layout object sequence.

The control functions 611A to 613A act to call a logical object; while the control functions 611B to 612B act to call a layout object.

The attribute 640 indicative of the logical object sequence includes a pointer 641 having a value "1" set therein with respect to a basic logical object 661 having a text "X", a pointer 642 having a value "2" set therein with respect to a basic logical object 662 having a text "Y", and a pointer 643 having a value "3" set therein with respect to a basic logical object 663 having a mathematical formula.

Prior to the layout processing, the control functions 611B, 612B and 613B and the attribute 650 indicative of the layout object sequence are not set. In this case, the attribute 650 indicative of the layout object sequence includes a pointer 651 having a value "1" set therein with respect to a block 671 having a text "X", a pointer 652 having a value "2" set therein with respect to a block 672 having a text "Y", and a pointer 653 having a value "3" set therein with respect to a block 673 having a mathematical formula.

Now explanation will be directed to the layout processing to the basic logical object 620.

First, the document structure layout unit 103 calls the content layout unit 104 to perform layout processing over the basic logical object 620. The called content layout unit 104, for the purpose of content layout to the basic logical object 620, first extracts the control function 611A from the graphic content portion 610. Thus, the document structure layouting unit 103 is further called to request the layout of the partial logical structure.

Since the called document structure layout unit 103 again calls the content layout unit 104 because the partial logical structure to be laid out is a basic logical object. In this way, when the partial logical structures embedded in the content portion consist of only basic logical objects, the content layout unit 104 calls the document structure layout unit 103, but the content layout unit 104 is immediately called by the document structure layout unit 103 to perform the content layout processing.

When the content layout unit 104 extracts the control function 611A, the unit 104 refers to the parameter value set in the control function 611A among the pointer sequence (in this example, the pointers "1", "2" and "3") to the logical object sequence held by the attribute 640 indicative of the logical object sequence, and extracts the pointer (in this example, the pointer value "1") corresponding to the parameter value "1" to specify the basic logical object 661 having the text "X".

Next, the content layout unit 104 performs its content layout processing over the specified basic logical object 661 to thereby generate the block (layout object) 671 having the text "X". At this time, the pointer 651 to the layout object 671 is added to the value of the attribute 650 indicative of the layout object sequence. The content layout unit 104 inserts the control function 611B in the graphic content portion 610 to set the order (in this example, the first) of the block (layout object) having the text "X" in the layout object sequence as the parameter value of the control function 611B. Accordingly, the value "1" is set in the parameter of the control function 611B.

Similarly, even when the control functions 612A and 613A are extracted, substantially the same operation as the above is carried out. As a result, such a relationship between the logical and layout structures as shown in FIG. 6 is attained. That is, blocks 671, 672 and 673 are arranged within the block 630.

When a Mathematical Formula/graph/text are Embedded in a Table

Figure 7A:
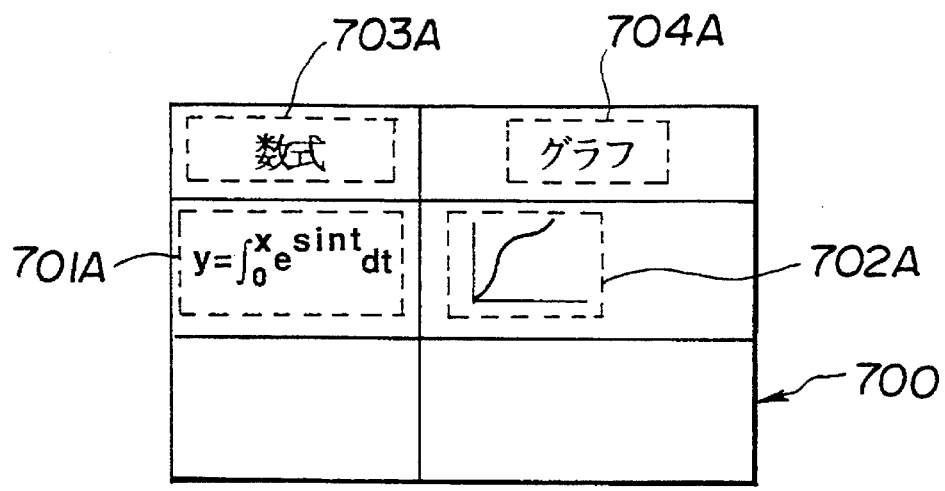
FIGS. 7(a)–(b) show diagrams for explaining how mathematical formulas, graphs and texts are embedded in a table in the first embodiment.
Figure 7B:
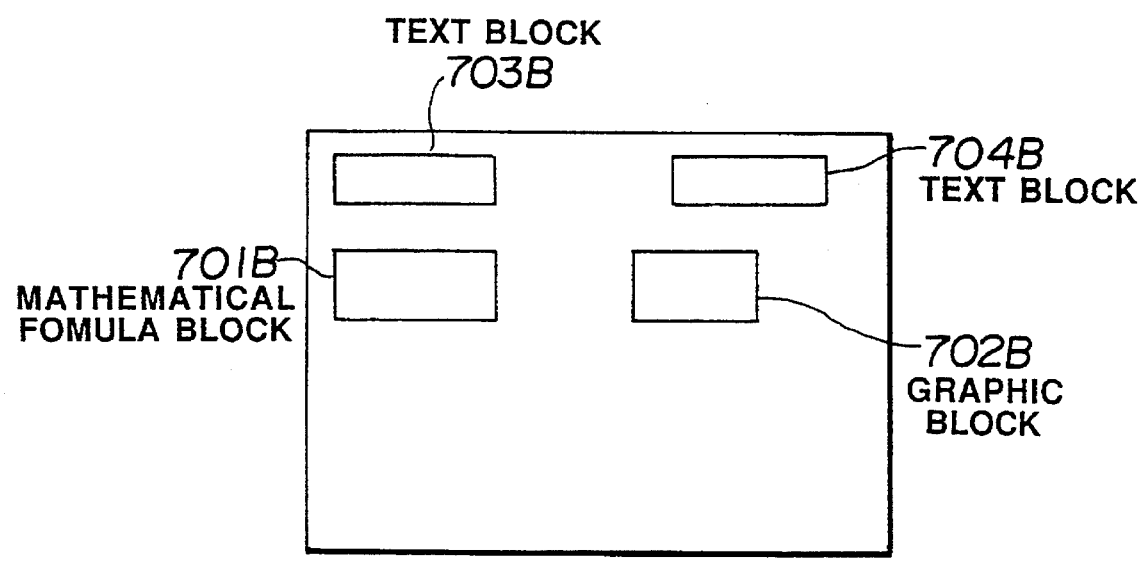

FIG. 7(a) shows the display image of a table content when a mathematical formula 701A, a graph 702A and texts 703A and 704A are embedded in a table 700. FIG. 7(b) diagrammatically shows regions occupied by the corresponding mathematical formula, graph and text layout objects. In FIG. 7(b), reference symbol 701B denotes a mathematical formula block. 702B denotes a graphic block, and 703B and 704B denote text blocks, respectively. The mathematical formula block 701B corresponds to the mathematical formula 701A, the graphic block 702B corresponds to the graph 702A, the text block 703B corresponds to the text 703A, and the text block 704B corresponds to the text 704A, respectively.

Figure 8:
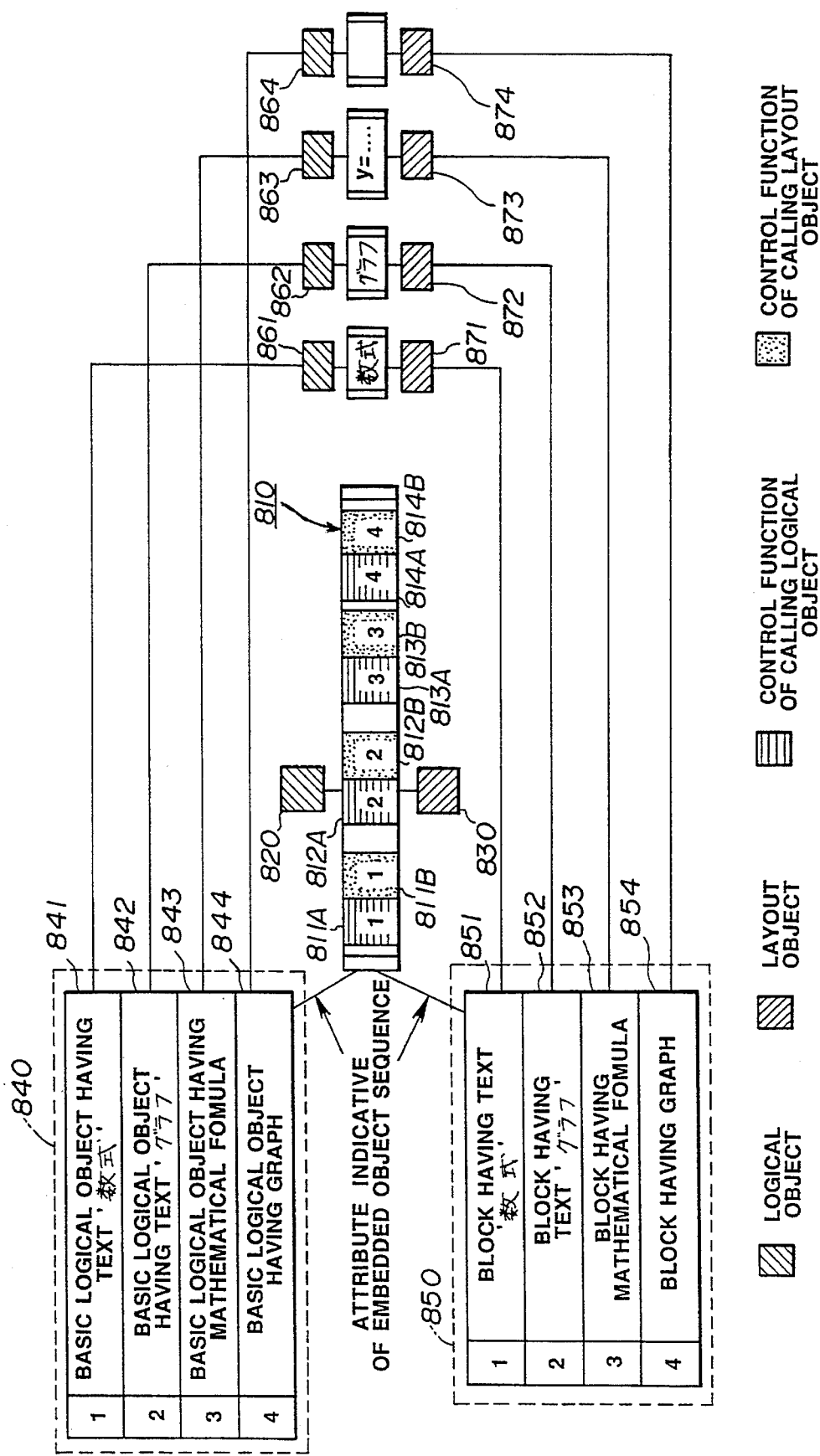
FIG. 8 is a diagram showing a relationship between logical and layout structures in the example of FIG. 7.

A relationship between logical and layout structures for obtaining such contents as shown in FIG. 7(a) is shown in FIG. 8.

In the example of FIG. 8, with respect to a basic logical object 820 having a table content portion 810, a block 830 having the table content portion 810 is generated. The table content portion 810 contains a control function 811A having a parameter value "1" set therein, a control function 812A having a parameter value "2" set therein, a control function 813A having a parameter value "3" set therein, a control function 814A having a parameter value "4" set therein, a control function 811B having a parameter value "1" set therein, a control function 812B having a parameter value "2" set therein, a control function 813B having a parameter value "3" set therein, a control function 814B having a parameter value "4" set therein, an attribute 840 indicative of a logical object sequence, and an attribute 850 indicative of a layout object sequence.

The control functions 811A to 814A act to call a logical object; while the control functions 811B to 814B act to call a layout object.

The attribute 840 indicative of the logical object sequence includes a pointer 841 having a value "1" set therein with respect to a basic logical object 861 having a text "X", a pointer 842 having a value "2" set therein with respect to a basic logical object 862 having a text "Y", a pointer 843 having a value "3" set therein with respect to a basic logical object 863, and a pointer 844 having a value "4" set therein with respect to a basic logical object 864.

Even in this case, prior to the layout processing, any control functions of calling a layout object and any layout objects (blocks) are not set in the attribute 850. Under such a condition, when substantially the same processing as for the aforementioned basic logical object 620 is carried out over the basic logical object 820, such a resultant content as shown in FIG. 8 is obtained. As a result, the blocks 871, 872, 873 and 874 are arranged within the block 830.

Figure 9A:
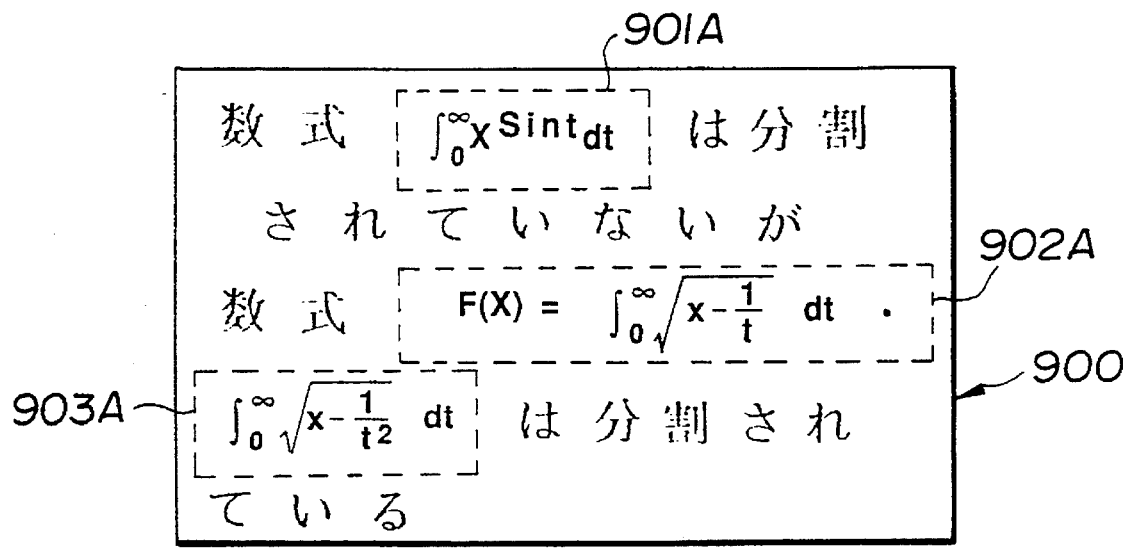
FIGS. 9(a)–(b) show diagrams for explaining how a mathematical formula (not divided) and a mathematical formula (divided) are embedded in a text in the first embodiment.
Figure 9B:
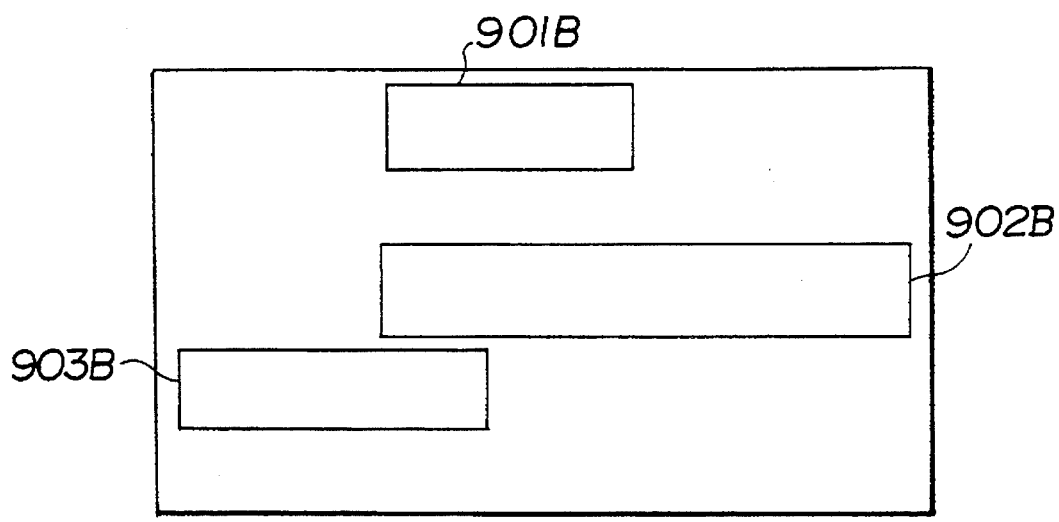

When a Mathematical Formula (Without Any Division)/mathematical Formula (With Division) are Embedded in a Text FIG. 9(a) shows the display image of a text content when a mathematical formula (without any division) 901A, and a mathematical formula (with division) 902A and 903A are embedded in a text 900. FIG. 9(b) diagrammatically shows regions occupied by the corresponding mathematical formulas (without and with division). In FIG. 9(b), reference symbol 901B, 902B and 903B denote mathematical formula blocks. The mathematical formula block 901B corresponds to the mathematical formula (without any division) 901A, the mathematical formula block 902B corresponds to the mathematical formula (with division) 902A, the mathematical formula block 903B corresponds to the mathematical formula (with division) 903A, respectively.

A relationship between logical and layout structures for obtaining such contents as shown in FIG. 9(a) is shown in FIG. 10.

In the example of FIG. 10, a character content portion 1010 contains a control function 1011A having a parameter value "1" set therein, a control function 1012A having a parameter value "2" set therein, a control function 1011B having a parameter value "1" set therein, a control function 1012B having a parameter value "2" set therein, a control function 1013B having a parameter value "3" set therein, an attribute 1040 indicative of a logical object sequence, and an attribute 1050 indicative of a layout object sequence.

The control functions 1011A and 1012A act to call a logical object; while the control functions 1011B through 1013B act to call a layout object.

The attribute 1040 indicative of the logical object sequence includes a pointer 1041 having a value "1" set therein with respect to a basic logical object 1061 and a pointer 1042 having a value "2" set therein with respect to a basic logical object 1062. The attribute 1050 indicative of the layout object sequence includes a pointer 1051 having a value "1" set therein with respect to a block 1071, a pointer 1052 having a value "2" set therein with respect to a block 1072A, and a pointer 1053 having a value "3" set therein with respect to a block 1072B. In this case, with respect to the logical object 1062, the content portion is divided into the blocks 1072A and 1072B.

Even in this case, prior to the layout processing, any control functions of calling a layout object and any layout objects (blocks) are not set in the attribute 1050. Under such a condition, when substantially the same processing as for the aforementioned basic logical object 620 is carried out over the basic logical object 1020, such a resultant content as shown in FIG. 10 is obtained. As a result, the blocks 1071, 1072A and 1072B are arranged within the block 1030.

As has been explained in the foregoing, in accordance with the first invention, such layout can be realized that another medium is embedded in an embedded medium (for example, a mathematical formula is further embedded in a text within a graphic frame). Further, due to a document structure appearing in the middle, data (such as the layout of a boxed item), which would be hard to be expressed in terms of content portion, can be expressed.

Next, a second embodiment of the present invention will be explained with reference to FIGS. 11 to 20.

Figure 11:
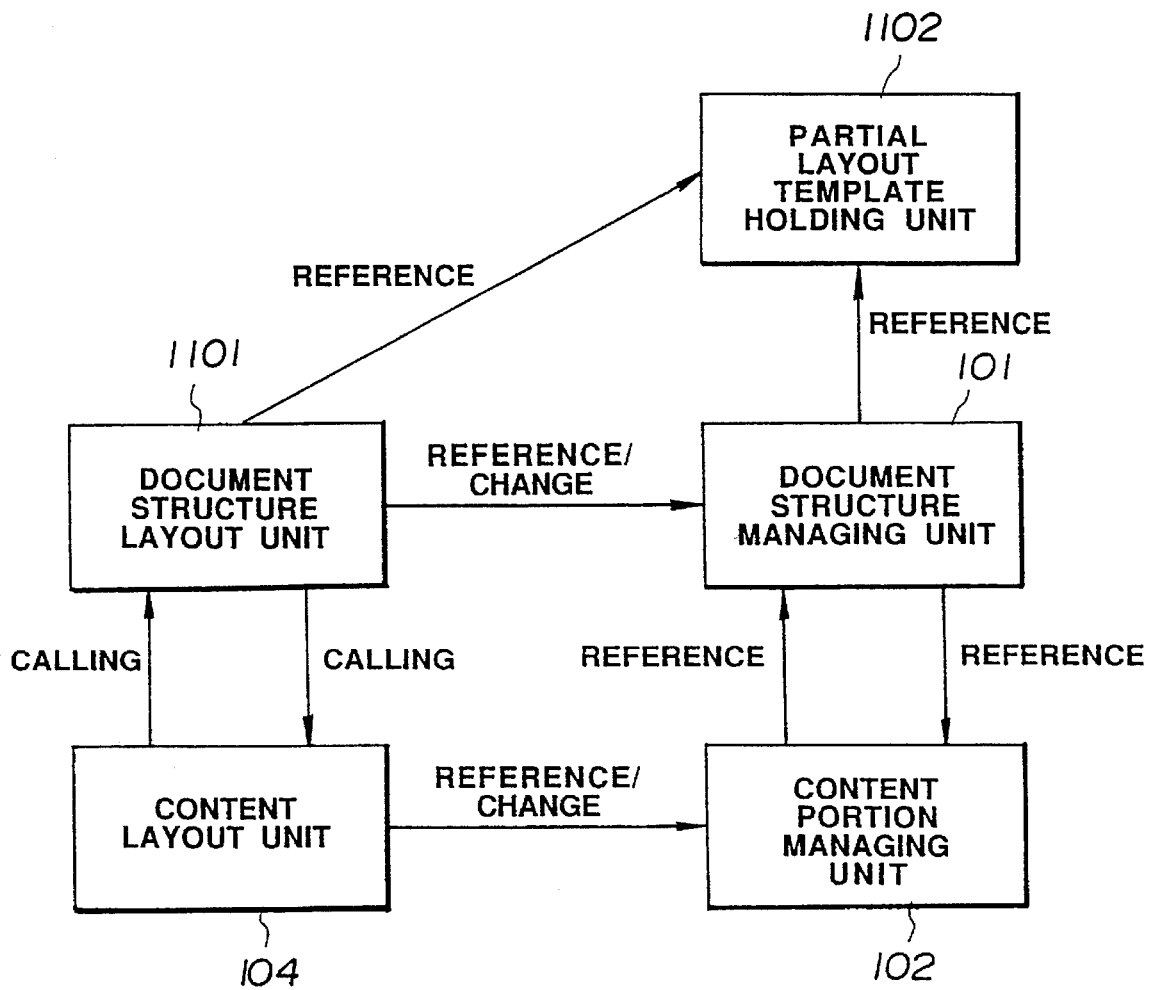
FIG. 11 is a functional block diagram of a document processing system in accordance with a second embodiment of the present invention.

FIG. 11 shows a functional block diagram of a document processing system in accordance with the second embodiment of the present invention. The functional block diagram of FIG. 11 corresponds to the functional block diagram of the first embodiment of FIG. 1 but is different therefrom in that the document structure layout unit 103 is changed to a document structure layout unit 1101 and a partial layout template holding unit 1102 is newly added. In FIG. 11, constituent elements having substantially the same functions as those in FIG. 1 are denoted by the same reference numerals.

The partial layout template holding unit 1102 holds a layout style and a partial layout template. The layout style is referred to by the logical object under management of the document structure managing unit 101, and its layout object class is specified by an attribute "layout object class". That is, the layout object class in the layout table is specified by the attribute "layout object class" of the layout style. The layout template is a rule according to which the document structure (i.e., the partial logical structure of the partial document structure) being referred to by the content portion is laid out. Such a logical object referring to the layout style is arranged in the layout object generated from the specified layout object class.

The partial layout template holding unit 1102 is realized in the form of such a memory as a hard disk or a main memory.

The document structure layout unit 1101 has, in addition to the aforementioned function of the document structure layout unit 103, a function of layout of a partial logical structure to generate a partial layout structure. The partial layout structure is generated under the restrictions of the partial layout template held in the partial layout template holding unit 1102. In other words, the partial logical structure is controlled by the partial layout template. In the present embodiment, the layout template applied at the time of layout of the document structure (logical structure) is handled as being different from the partial layout template applied at the time of layout of the document structure (i.e., the partial logical structure of the partial document structure) referred to by the content portion.

Figure 3:
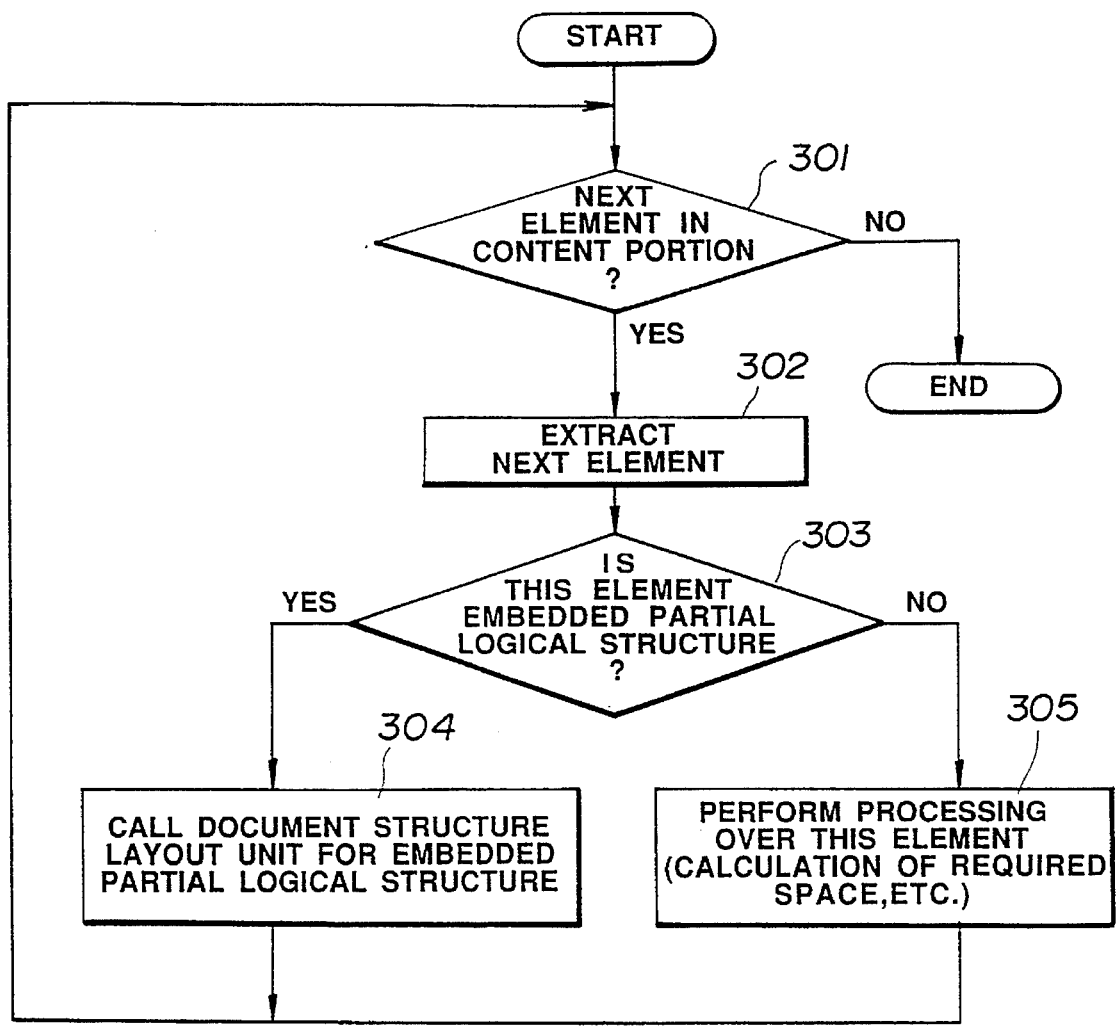
FIG. 3 is a flowchart for schematically explaining the operation of a content layout processing in the first embodiment.

Even in the present embodiment, its processing is basically carried out based on the flowcharts of FIGS. 3 and 4 already explained in connection with the first embodiment. However, in the steps 404 and 406 of the flowchart of FIG. 4, the layout processing of the partial logical structure is carried out under the restrictions of the partial layout template held in the partial layout template holding unit 1102.

Next, explanation will be made in connection with specific examples.

When a Graphic/comment Note are Embedded in a Text

Figure 12A:
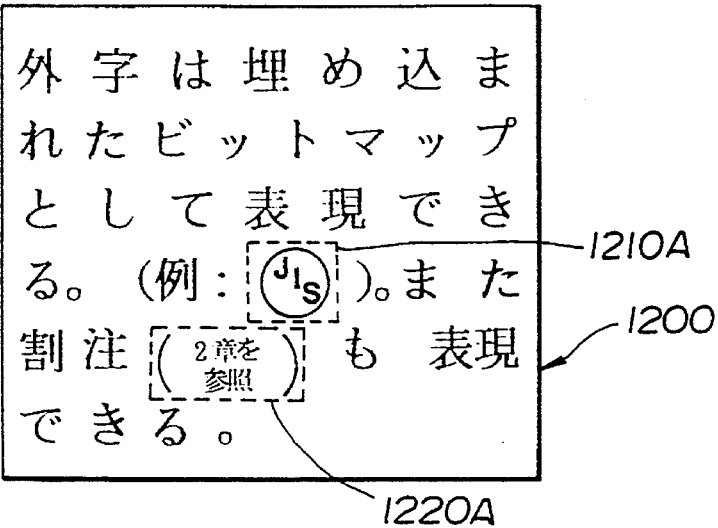
FIGS. 12(a)–12(b) show diagrams for explaining how a graphic symbol and a comment note are embedded into a text in the second embodiment.
Figure 12B:
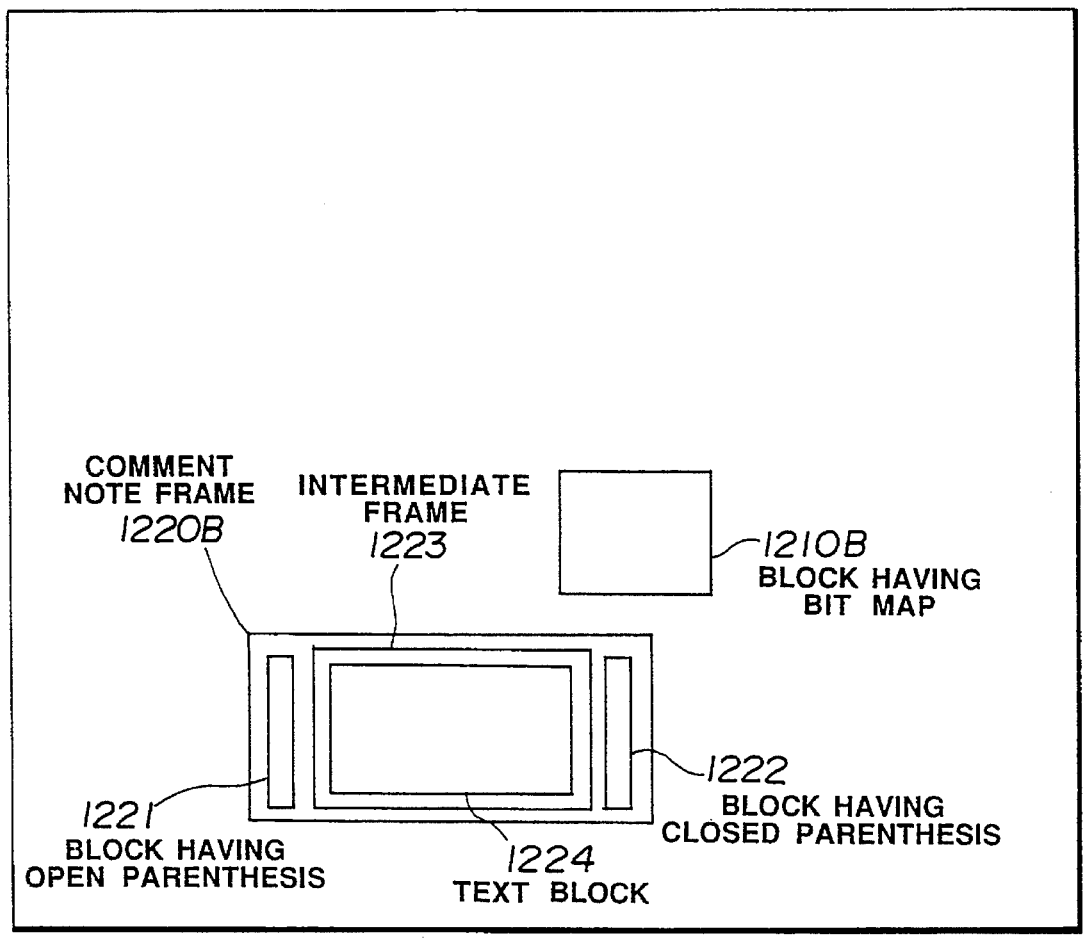

FIG. 12(*a*) shows an exemplary display image of a text content when a graphic 1210A and a comment note 1220A are embedded into a text 1200, and FIG. 12(*b*) diagrammatically shows regions occupied by layout objects of the corresponding graphic and comment note. In FIG. 12(*b*), reference symbol 1210B denotes a block having a bit map which corresponds to the graphic 1210A. Further, reference symbol 1220B denotes a comment note frame, numeral 1221 denotes a block having an open parenthesis, 1222 denotes a closed parenthesis, 1223 denotes an intermediate frame, and 1224 denotes a text block. These blocks and frame correspond to the comment note 1220A. Shown in FIG. 13 is a relationship between logical structures and content portions prior to the layout processing in connection with such contents as shown in FIG. 12(*a*).

Figure 13:
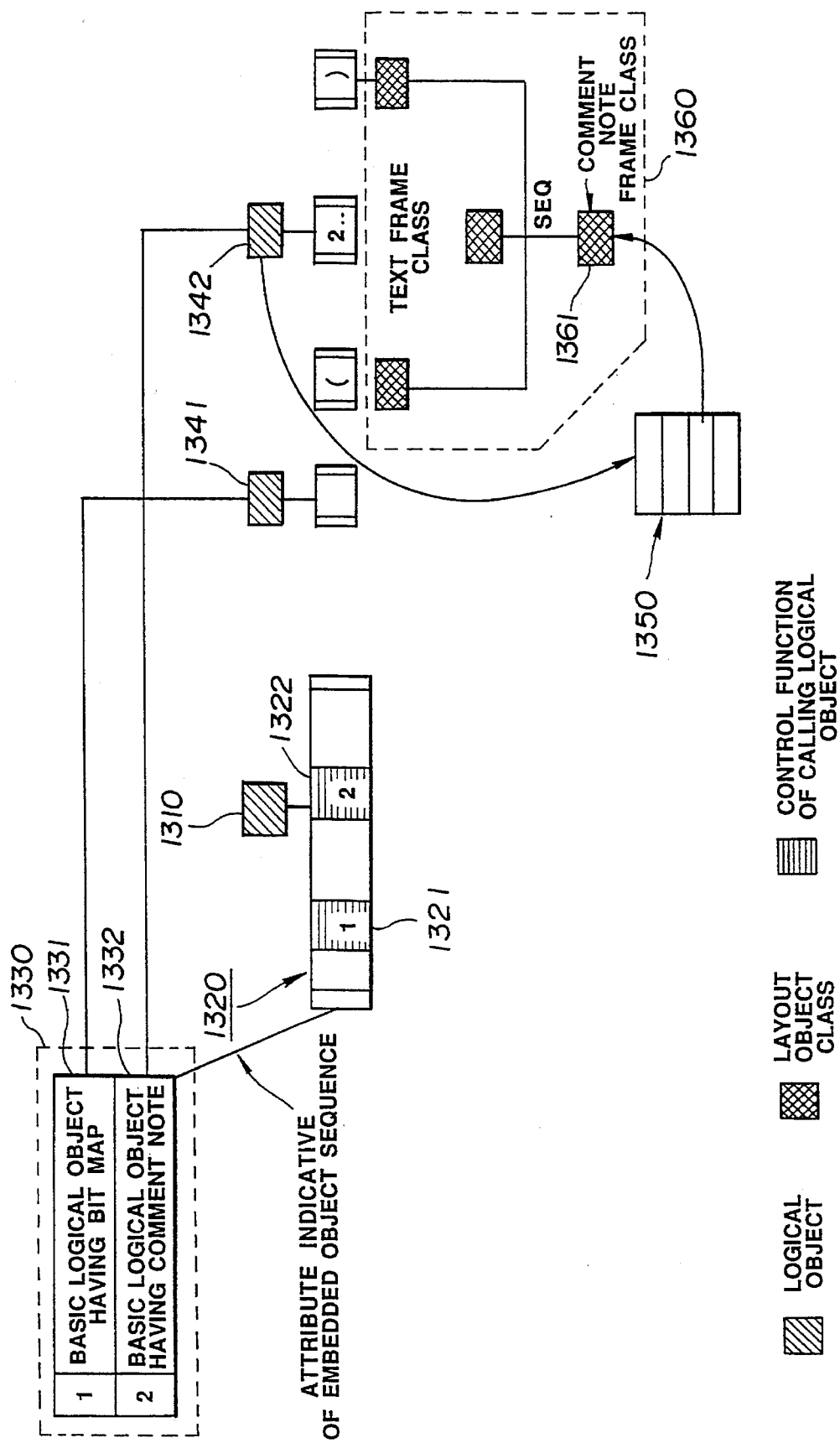
FIG. 13 is a diagram for explaining logical structures and content portions prior to layout processing in the example of FIG. 12.

In FIG. 13, a character content portion 1320 referred to by a basic logical object 1310 includes a control function 1321 having a parameter value "1" set therein, a control function 1322 having a parameter value "2" set therein, and an attribute 1330 indicative of a logical object sequence. The control functions 1321 and 1322 act to call a logical object.

The attribute 1330 indicative of the logical object sequence includes a point 1331 having a value "1" set therein with respect to a basic logical object 1341 having a bit map and a point 1332 having a value "2" set therein with respect to a basic logical object 1342 for the comment note.

The basic logical object 1342 makes reference to a layout style 1350 whose attribute "layout object class" specifies a comment note frame class 1361 of a layout object class in a layout template 1360. A rectangular positional relationship in the comment note is determined by the layout template 1360.

Figure 14:
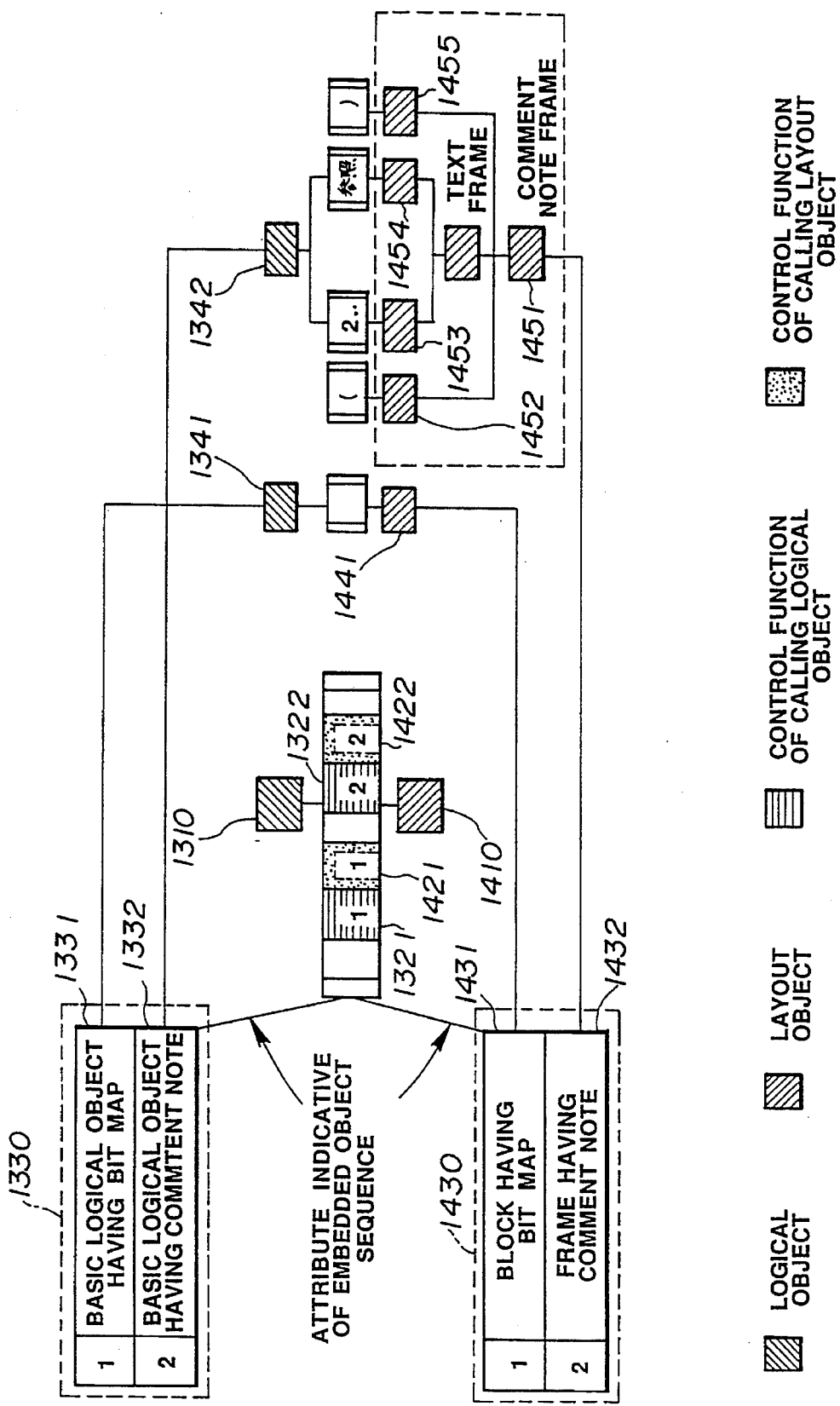
FIG. 14 is a diagram showing a relationship between logical and layout structures in the example of FIG. 12.

FIG. 14 shows a relationship between logical and layout structures when layout processing is carried out from the aforementioned state.

As shown in FIG. 14, a block (layout object) 1410 having the character content portion 1320 is generated with respect to the basic logical object 1310. The generation of the block 1410 results in that the character content portion 1320 includes a control function 1421 having a parameter value "1" set therein, a control function 1422 having a parameter value "2" set therein, and an attribute 1430 indicative of a layout object sequence. The control functions 1421 and 1422 act to call a layout object.

An attribute 1430 includes a pointer 1431 having a value "1" set therein with respect to a layout object (block) 1441 generated in association with the basic logical object 1341 and a pointer 1432 having a value "2" set therein with respect to a comment note frame of a partial layout structure 1450 generated in association with the basic logical object 1342.

Explanation will now be made as to the layout processing of the basic logical object 1310.

First, the document structure layout unit 1101, at the time of layout of the basic logical object 1310, calls the content layout unit 104. During the content layout processing of the character content portion 1320, when the called content layout unit 104 finds the control function 1321, the unit 104 performs substantially the same operation as in the embodiment of FIG. 6. Thus, the content layout unit 104 generates the block 1441 which in turn is connected to the character content portion 1320.

When the content layout unit 104 advances its content layout processing and finds the control function 1322, the unit 104 specifies the object associated with the parameter value "2" set in the control function 1322 by making reference to the attribute 1330. In this case, the content layout unit 104 specifies the basic logical object 1342.

Then, the content layout unit 104 calls the document structure layout unit 1101 to provide the specified basic logical object 1342 thereto to request the unit 1101 to perform the layout processing thereover.

In response to the request, the document structure layout unit 1101 generates the partial layout structure 1450 under the restrictions of the partial layout template 1360 shown in FIG. 13 with respect to the basic logical object 1342. Of course, blocks 1452,1453, 1454 and 1455 in the partial logical structure are generated by the content layout unit 104 called by the document structure layout unit 1101. As a result, the block 1441 having the bit map and the comment note frame 1451 are arranged within the character content portion 1320. In this case, the block 1441 corresponds to the block 1210B in FIG. 12(*b*) and the comment note frame 1451 corresponds to the comment note frame 1220B in FIG. 12(*b*).

When Agate-attached Chinese Characters are Embedded in a Text

Figure 15A:
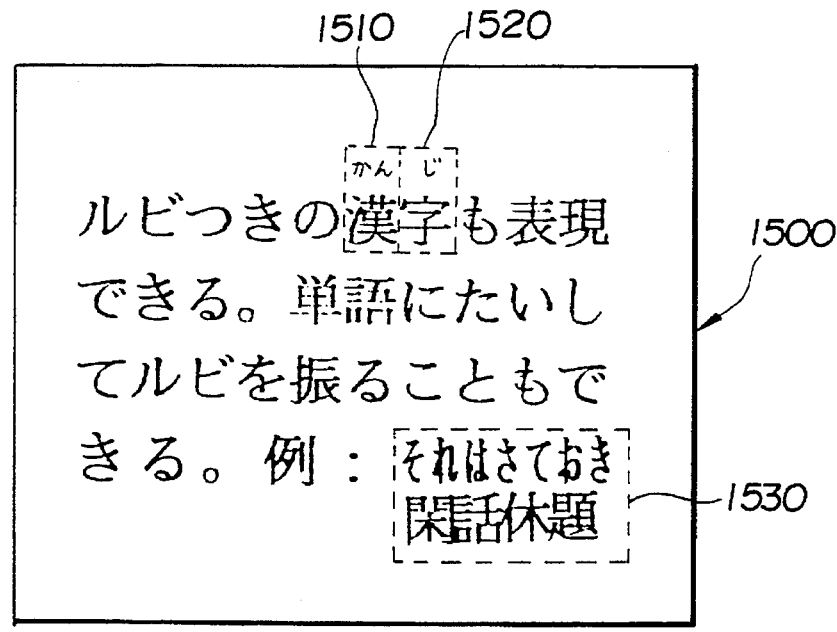
FIGS. 15(a)–(b) show diagrams for explaining how agate-attached (ruby-attached) or Kana-attached Chinese characters are embedded into a text in the second embodiment.
Figure 15B:
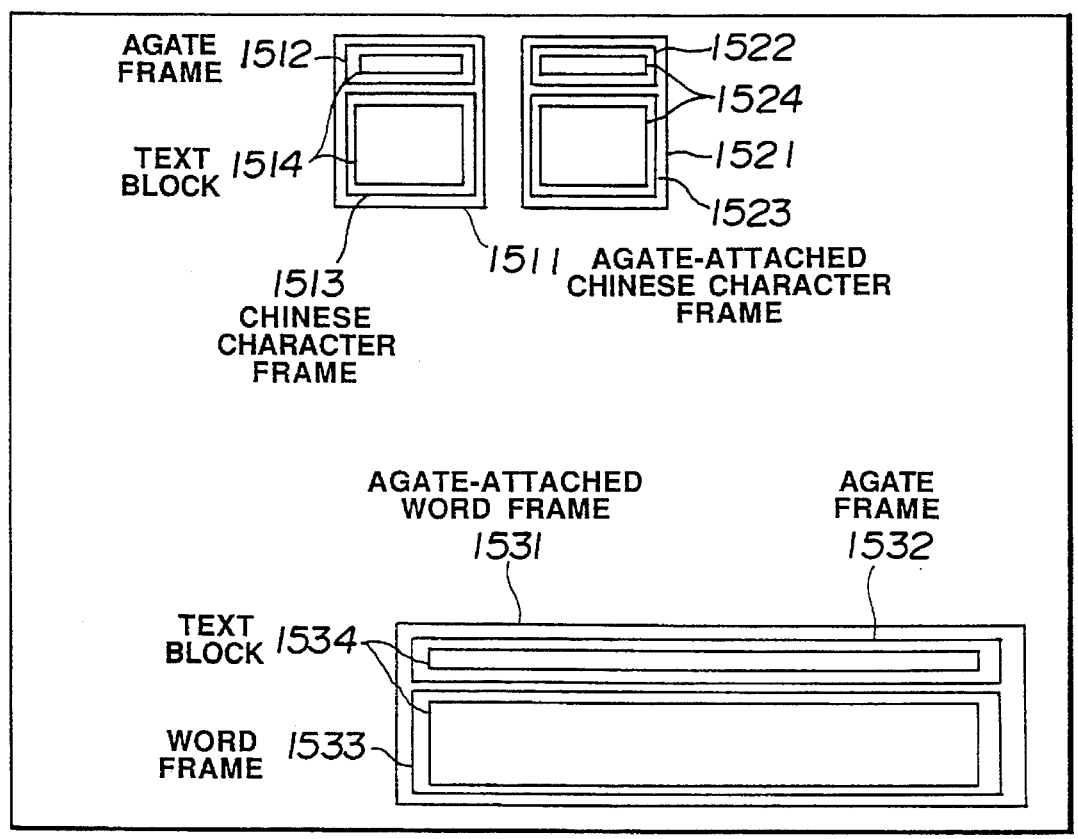

FIG. 15(*a*) shows an exemplary display image of a text content when agate-attached (ruby-attached) or Kana-attached Chinese characters 1510, 1520 and 1530 are embedded in a text 1500, and FIG. 15(*b*) diagrammatically shows regions occupied by layout objects corresponding to the agate-attached Chinese characters.

In FIG. 15(*b*), reference numeral 1511 denotes an agate-attached Chinese character frame, 1512 denotes an agate-attachment frame, 1513 denotes a Chinese character frame, and 1514 denotes text blocks. These frames and block correspond to the agate-attached Chinese character 1510. Further, reference numeral 1521 denotes an agate-attached Chinese character frame, 1522 denotes an agate-attachment frame, 1523 denotes a Chinese character frame, and 1524 denotes text blocks. These frames and blocks correspond to the agate-attached Chinese character 1520. Furthermore, reference numeral 1531 denotes an agate-attached word frame, 1532 denotes an agate-attachment frame, 1533 denotes a word frame, and 1534 denotes text blocks. These frames and block correspond to the agate-attached Chinese character string 1530. Shown in FIG. 16 is a relationship between logical structures and content portions prior to the layout processing in connection with such contents as shown in FIG. 15(*a*).

Figure 16:
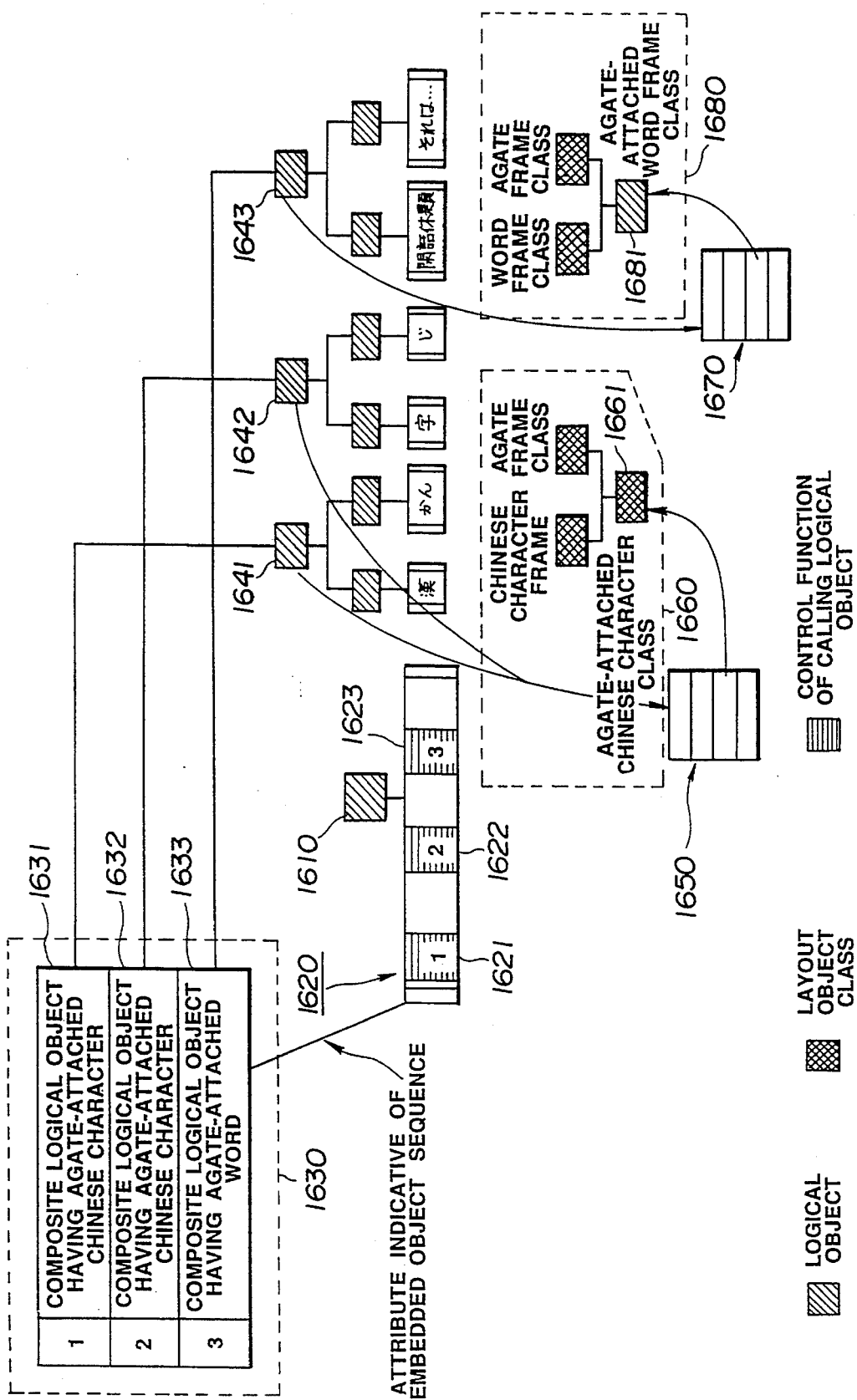
FIG. 16 is a diagram for explaining logical structures and content portions prior to layout processing in the example of FIG. 15.

In FIG. 16, a character content portion 1620 referred to by a basic logical object 1610 includes a control function 1621 having a parameter value "1" set therein, a control function 1622 having a parameter value "2" set therein, and a control function 1623 having a parameter value "3" set therein.

An attribute 1630 indicative of a logical object sequence includes a point 1631 having a value "1" set therein with respect to a composite logical object 1641 having an agate-attached character, a point 1632 having a value "2" set therein with respect to a composite logical object 1642 having an agate-attached character, and a point 1633 having a value "3" set therein with respect to a composite logical object 1643 having an agate-attached word.

The composite logical objects 1641 and 1642 both make reference to a layout style 1650 which attribute "layout object class" specifies an agate-attached Chinese character frame class 1661 of a layout object class in a partial layout template 1660.

Further, the composite logical object 1643 makes reference to a layout style 1670 which attribute "layout object class" specifies an agate-attached word frame class 1681 of a layout object class in a partial layout template 1680.

A positional relationship between the rectangular regions occupied by agate (ruby) and Chinese characters is determined by the partial layout templates 1660 and 1680.

Figure 17:
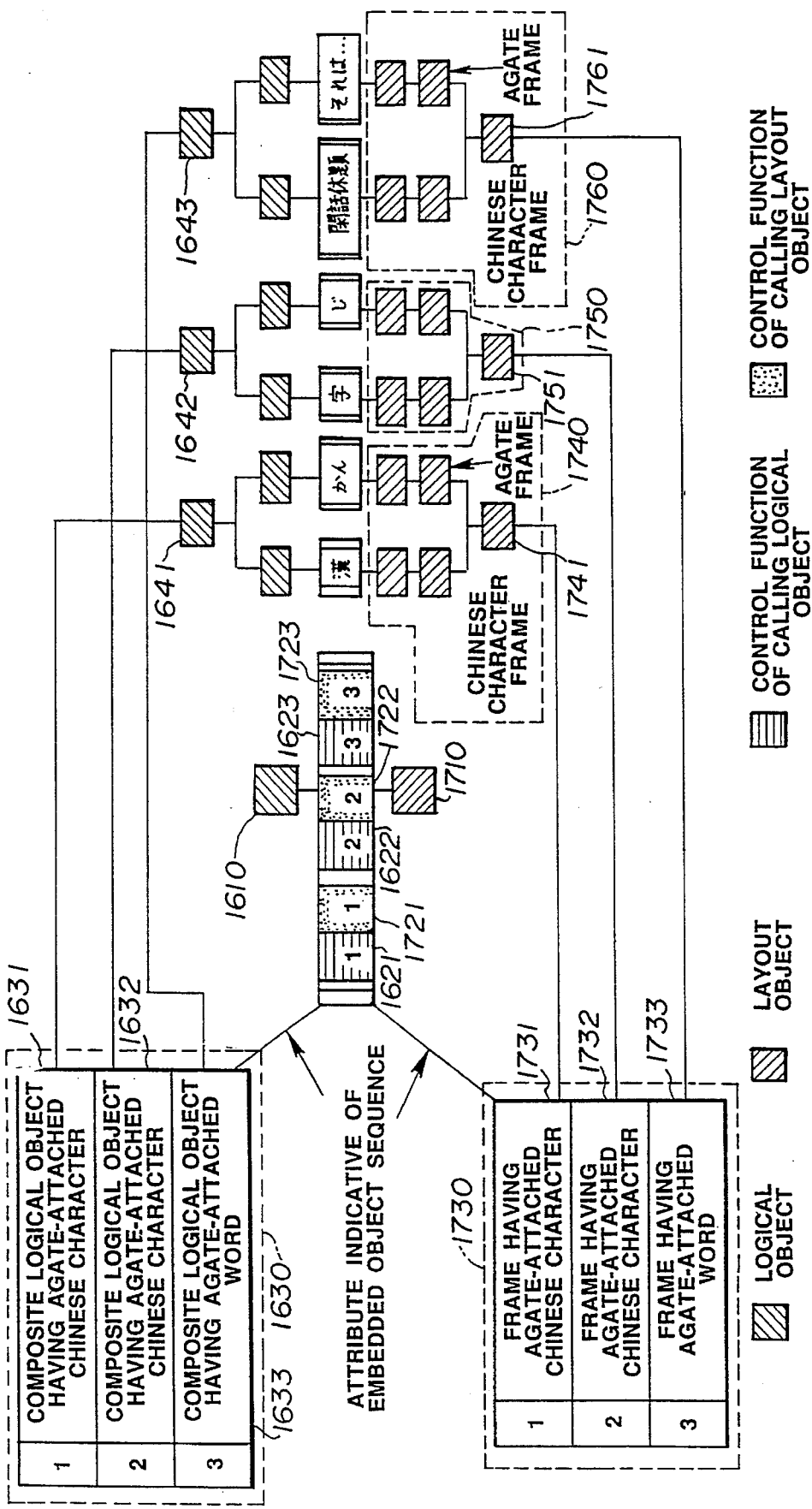
FIG. 17 is a diagram showing a relationship between the logical and layout structures in the example of FIG. 15.

FIG. 17 shows a relationship between logical and layout structures after layout processing is carried out from the aforementioned state.

As shown in FIG. 17, a block 1710 having the character content portion 1620 is generated with respect to the basic logical object 1610. The generation of the block 1710 results in that the character content portion 1620 includes a control function 1721 having a parameter value "1" set therein, a control function 1722 having a 1parameter value "2" set therein, and a control function 1723 having a parameter value "3" set therein.

An attribute 1730 includes a pointer 1731 having a value "1" set therein with respect to an agate-attached character frame 1741 of a partial logical structure 1740 generated in association with the composite logical object 1641, a pointer 1732 having a value "2" set therein with respect to an agate-attached character frame 1751 of a partial logical structure 1750 generated in association with the composite logical object 1642, and a pointer 1733 having a value "3" set therein with respect to an agate-attached word frame 1761 of a partial logical structure 1760 generated in association with the composite logical object 1643.

Explanation will now be made as to the layout processing of the basic logical object 1610 by the document structure layout unit 1101.

In this case, the content layout unit 104 called by the document structure layout unit 1101 sequentially makes reference to the control functions 1621, 1622 and 1623 while executing the content layout processing of the character content portion 1620. And the reference of these control functions causes the objects corresponding to the parameter values set in the respective control functions to be specified, after which the content layout unit 104 calls the document structure layout unit 1101 to request the unit 1101 to perform the layout processing. In this example, the content layout unit 104 sequentially specifies the composite logical objects 1641. 1642 and 1643. The document structure layout unit 1101 performs the layout processing over the composite logical objects 1641 and 1642 based on the partial layout template 1660 shown in FIG. 16 to generate partial layout structures 1740 and 1750. The layout processing based on the partial layout template 1680 shown in FIG. 16 causes generation of the partial layout structure 1760, the content layout unit 104 called by the document structure layout unit 1101 generates blocks of the respective partial logical structures.

As a result, arranged within the block having the character content portion are the agate-attached Chinese character frame 1741, the agate-attached Chinese character frame 1751, and the agate-attached word frame 1761. In this case, the frame 1741 corresponds to the frame 1511 in FIG. 15(*b*), the frame 1751 corresponds to the frame 1521 in FIG. 15(*b*), and the frame 1761 corresponds to the frame 1531 in FIG. 15(*b*).

In the Case of a Boxed Item

Figure 18:
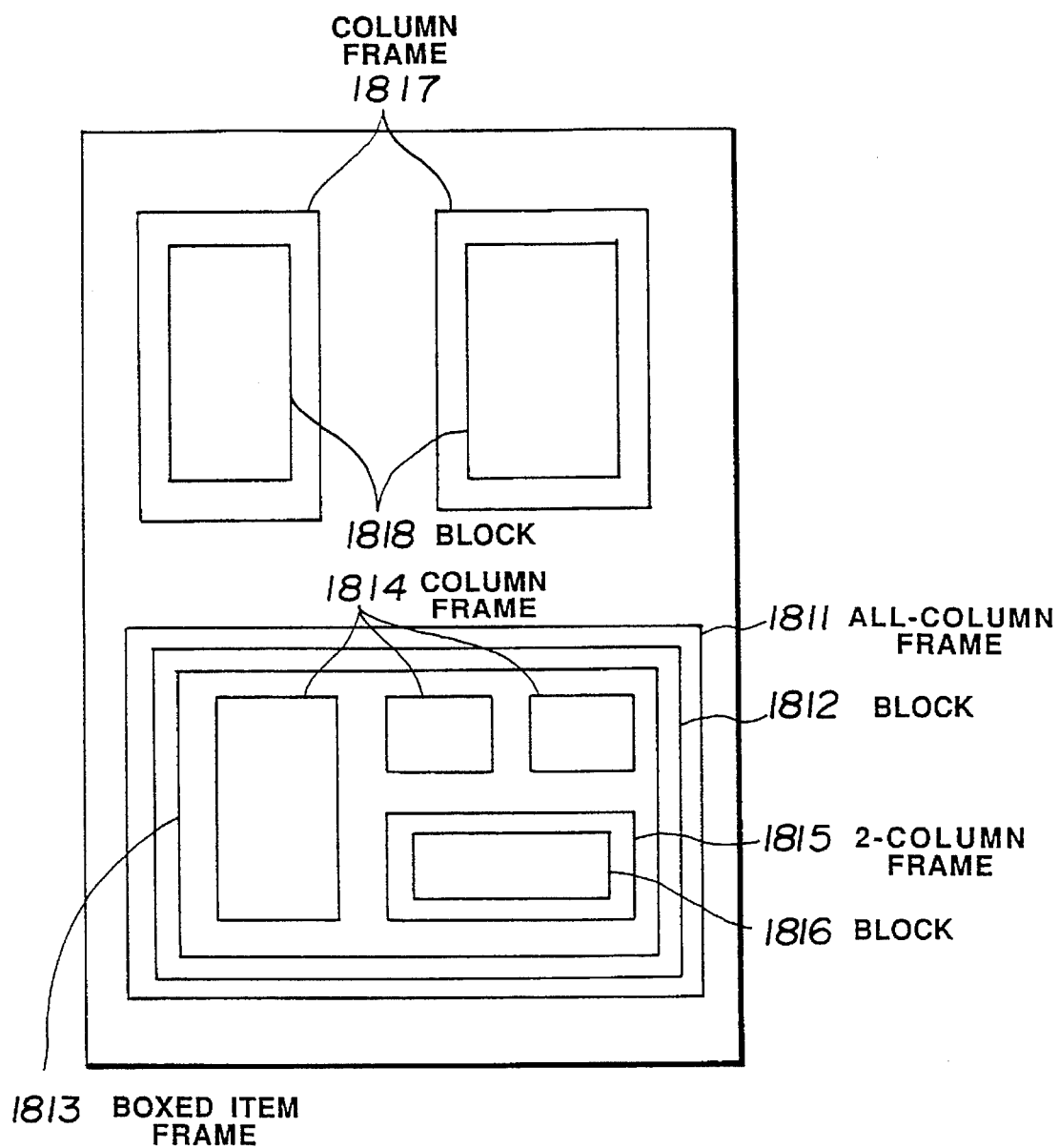
FIG. 18 is a diagram showing layout object regions in a boxed item in the second embodiment.
Figure 34:
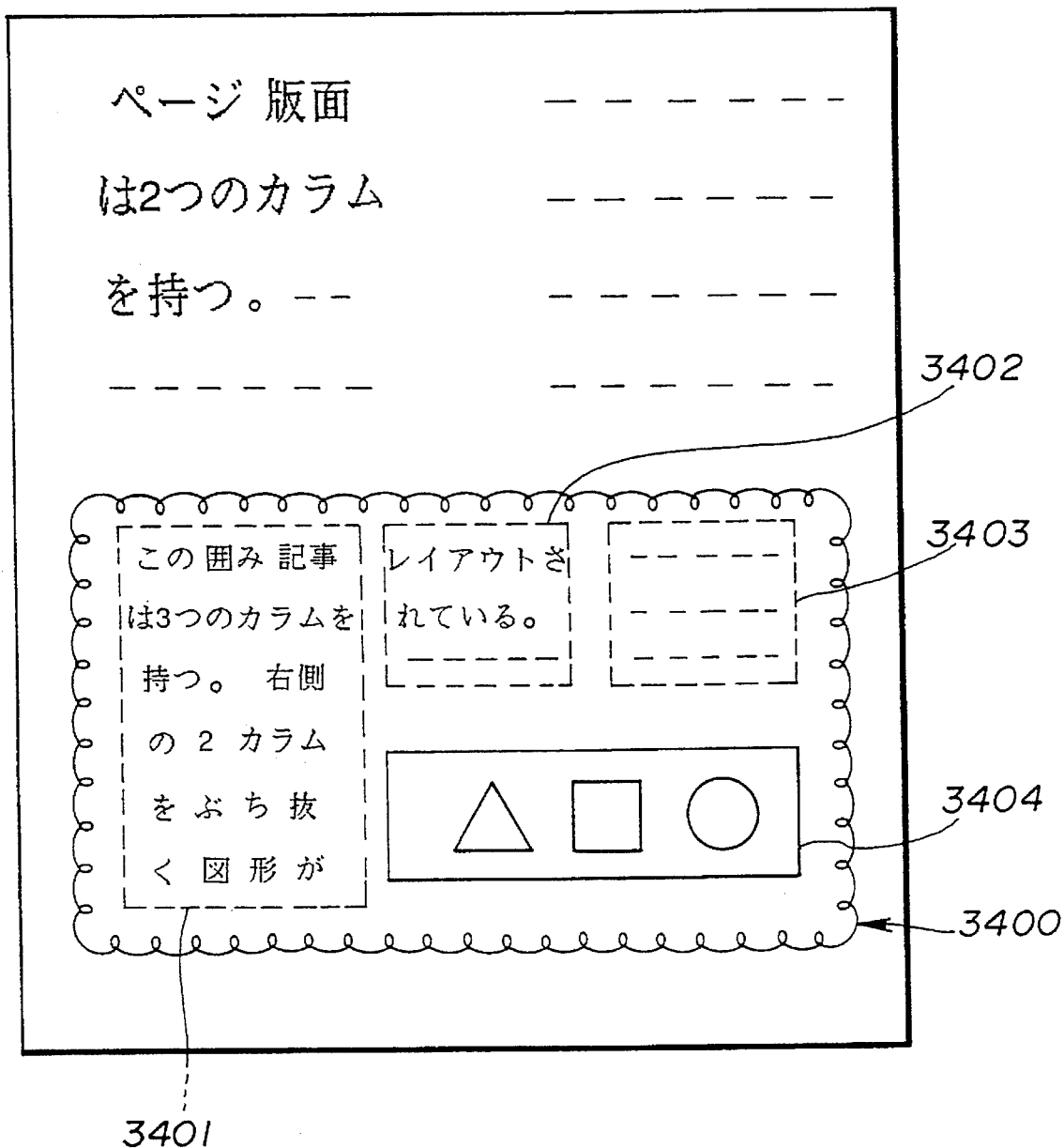
FIG. 34 is an example of document having a boxed item therein in the prior art.
Figure 35:
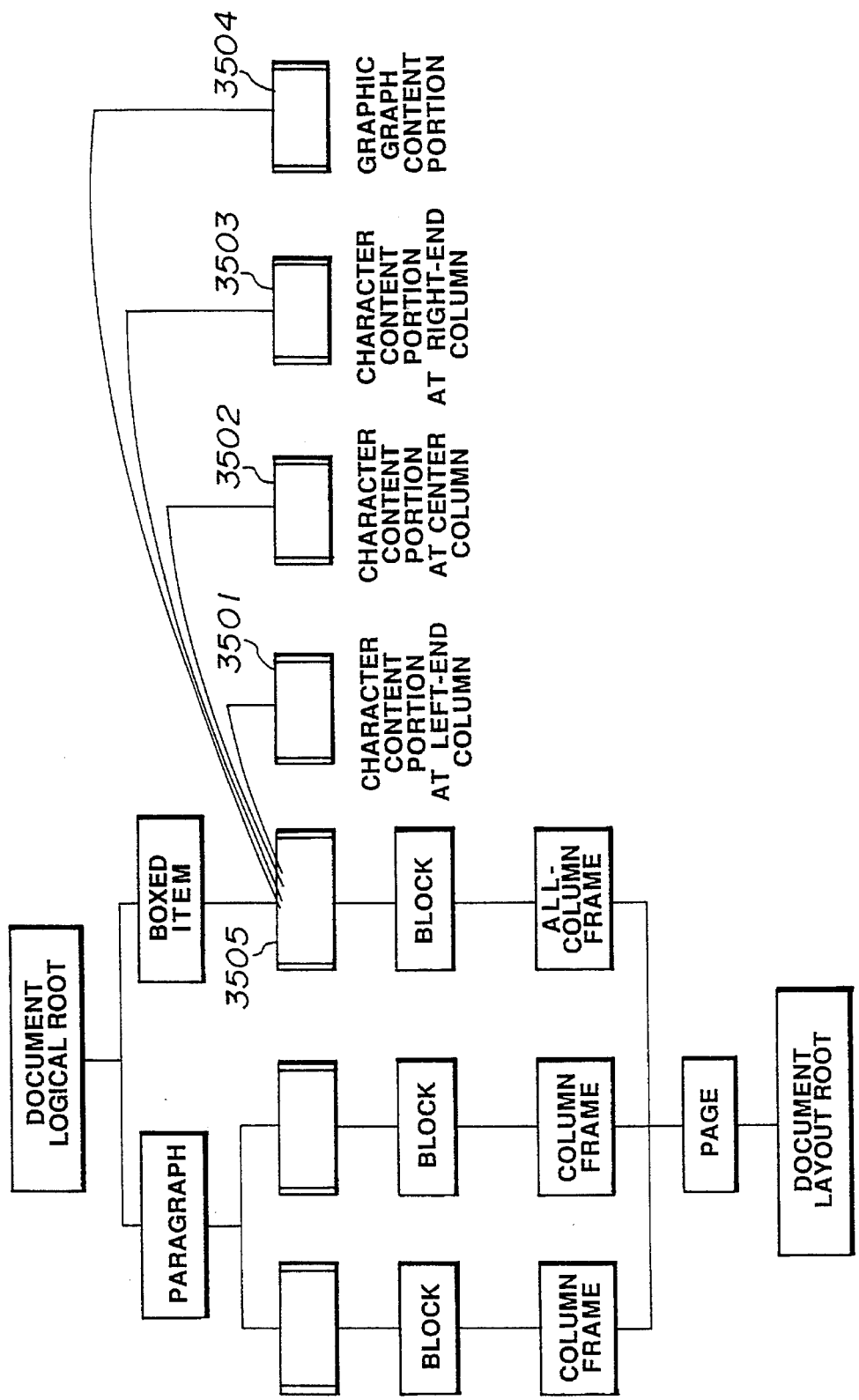
FIG. 35 is a diagram showing a relationship between logical and layout structures and content portions in the document of FIG. 34.

FIG. 18 is a diagram showing regions occupied by layout objects for the boxed item of FIG. 34. In FIG. 18, reference numeral 1811 denotes an all-column frame, 1812 denotes a block within the all-column frame 1811, 1813 denotes a boxed-item frame, 1814 denotes a column frame, 1815 denotes a two-column frame, 1816 denotes a block within the two-column frame 1815, 1817 denotes a column frame, and 1818 denotes a block within the column frame 1817.

Figure 19:
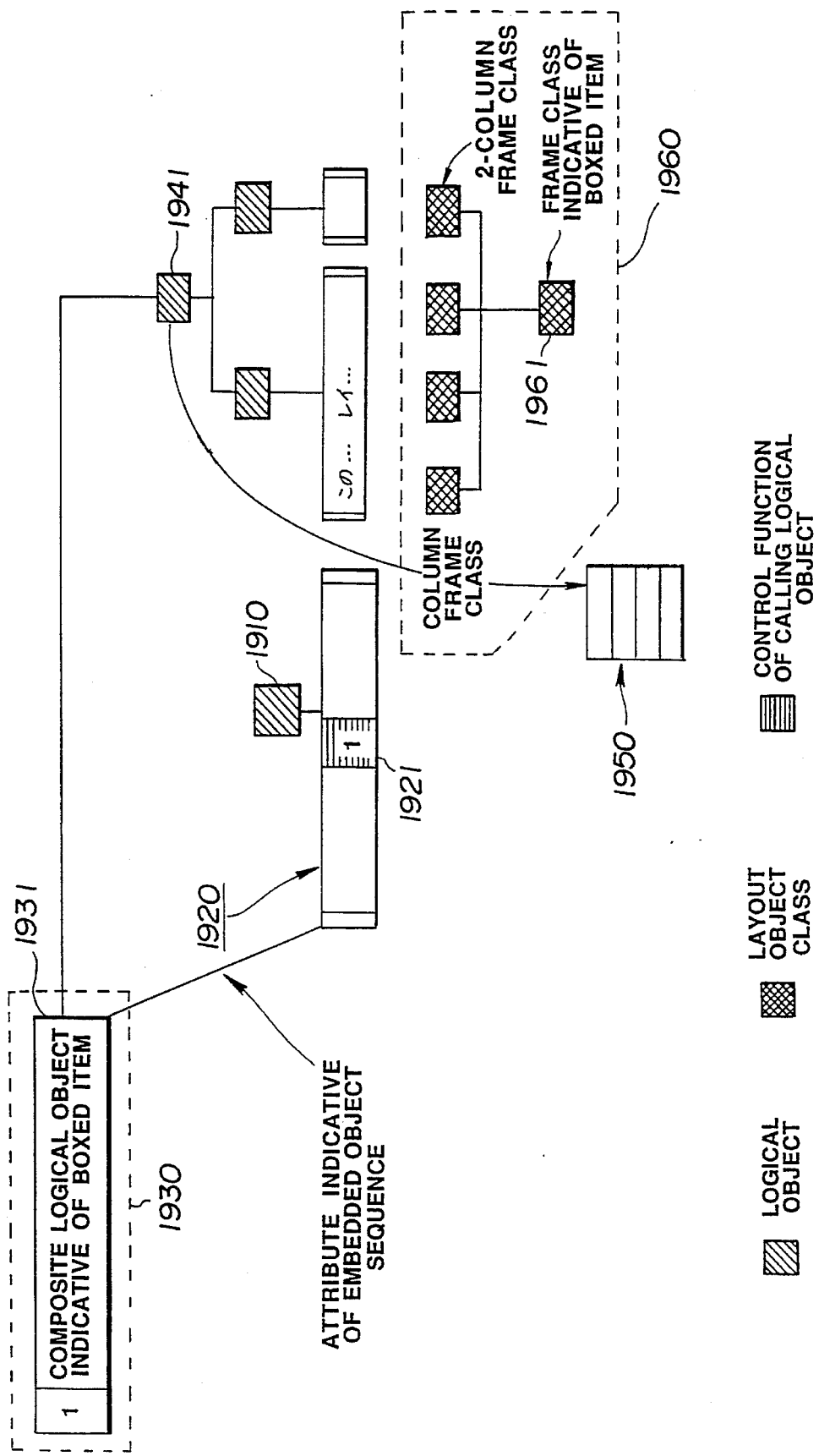
FIG. 19 is a diagram for explaining logical structures and content portions prior to layout processing in the example of FIG. 18.

Shown in FIG. 19 is a relationship between logical structures and content portions prior to the layout processing in connection with such contents as shown in FIG. 34.

In FIG. 19, a graphic content portion 1920 referred to by a basic logical object 1910 includes a control function 1921 of calling a logical object having a parameter value "1" set therein and an attribute 1930 indicative of a logical object sequence.

The attribute 1930 indicative of the logical object sequence includes a point 1631 having a value "1" set therein with respect to a composite logical object 1941 indicative of the boxed item.

The composite logical object 1941 makes reference to a layout style 1950 which attribute "layout object class" specifies a frame class 1961 indicative of the boxed item of a layout object class in a partial layout template 1960.

Further, the layout within the boxed item is described in the partial layout template 1960.

Figure 20:
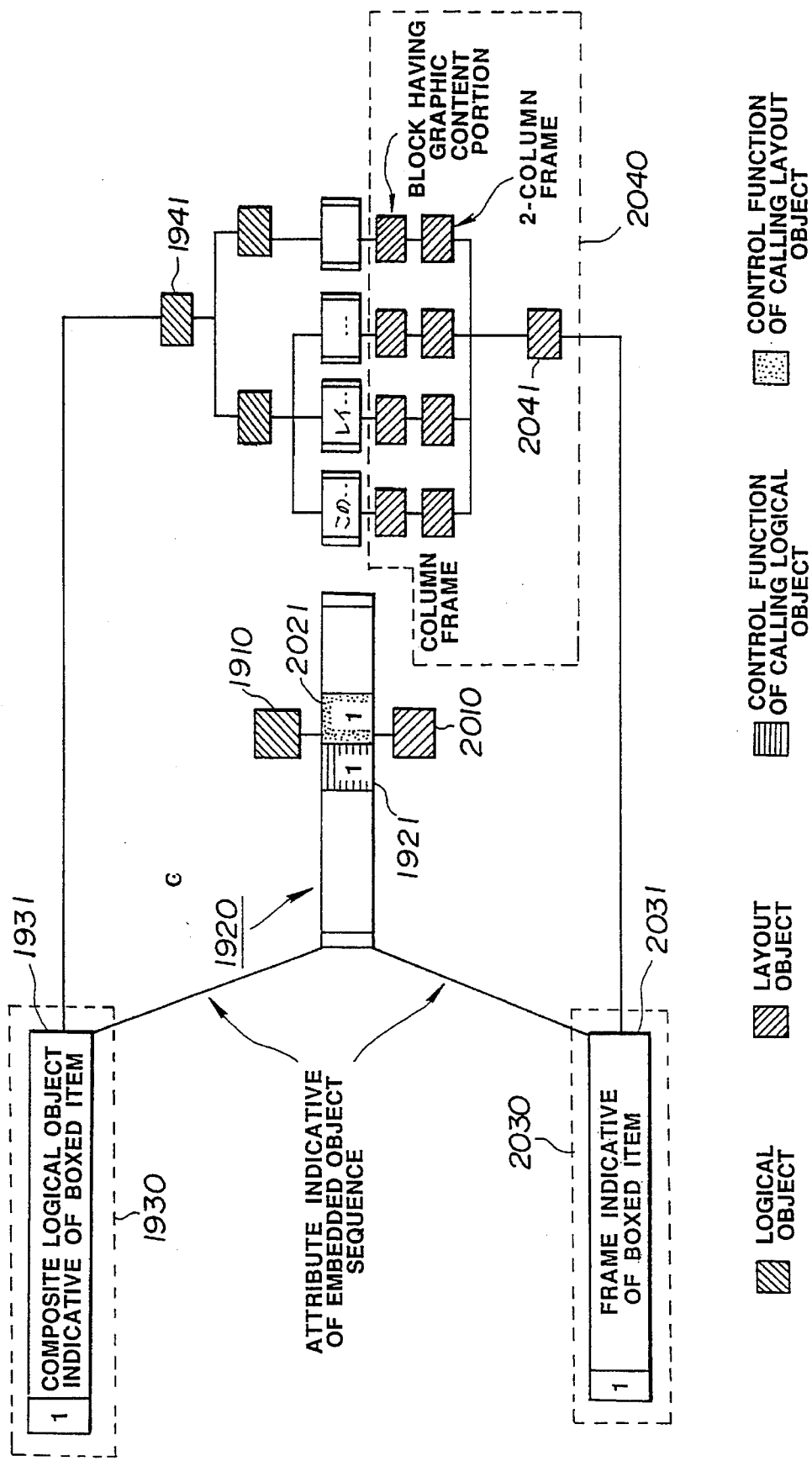
FIG. 20 is a diagram showing a relationship between the logical and layout structures in the example of FIG. 18.

FIG. 20 shows a relationship between logical and layout structures after the layout processing is carried out from the aforementioned state.

As shown in FIG. 20, a block 2010 is generated with respect to the basic logical object 1910. The generation of the block 2010 results in that the graphic content portion 1920 includes a control function 2021 of calling a layout object having a parameter value "1" set therein and an attribute 2030 indicative of a layout object sequence. The attribute 2030 includes a pointer 2031 having a value "1" set therein with respect to a boxed-item frame 2041 of a partial layout structure 2040 generated in association with the composite logical object 1941.

Even when the layout processing is carried out over the basic logical object 1910, substantially the same processing as the aforementioned layout processing over the basic logical object 1610 is carried out. Accordingly, the boxed-item frame 2041 is arranged within the graphic content portion 1920. The boxed-item frame 2041 corresponds to the boxed-item frame 1813 in FIG. 18.

As has been explained in the foregoing, in accordance with the second invention, such layout processing can be realized that another medium is embedded in an embedded medium (for example, a mathematical formula is further embedded in a text within a graphic frame). Further, due to a document structure appearing in the middle, data (such as the layout of a boxed item), which would be hard to be expressed in terms of content portion, can be expressed.

Figure 22:
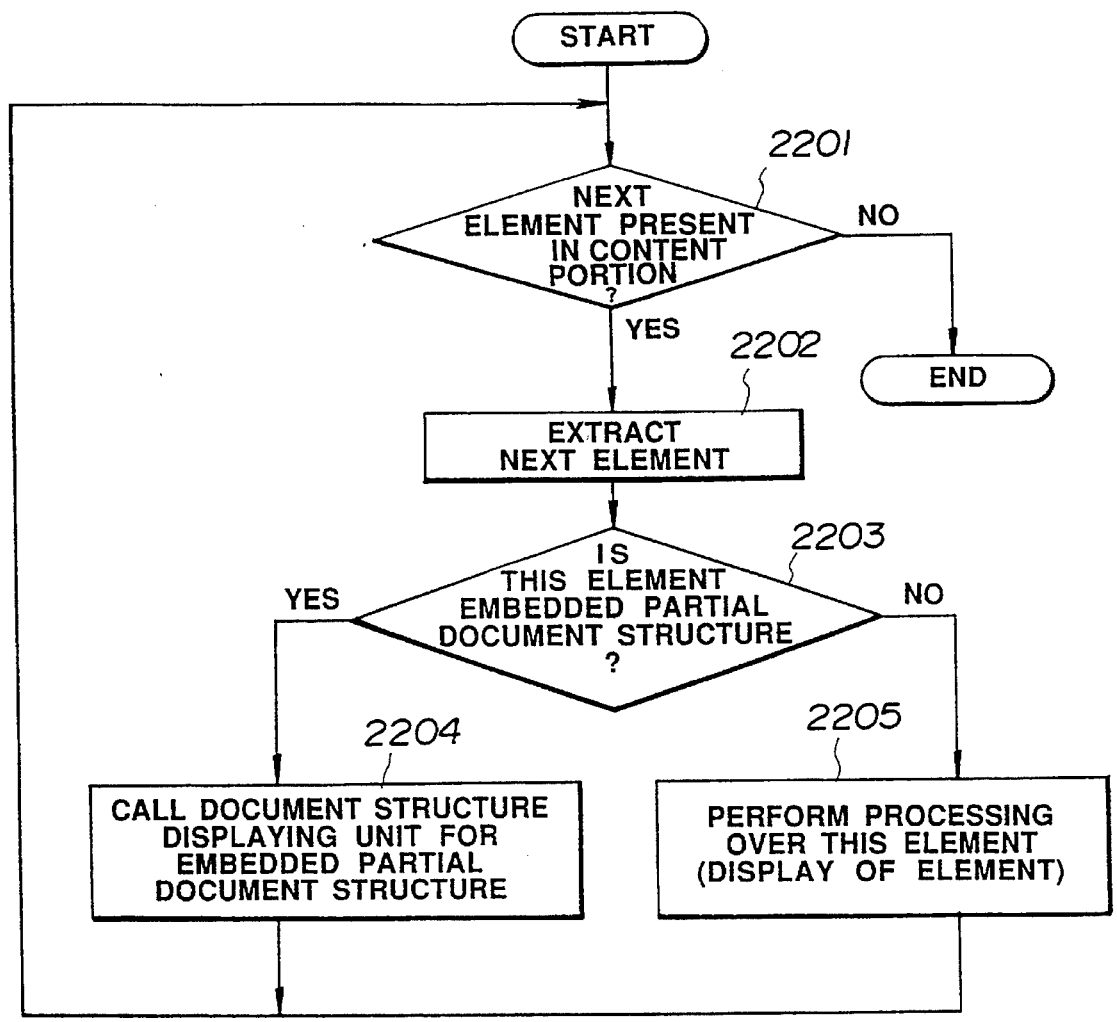
FIG. 22 is a flowchart for explaining the operation of a content display processing in the third embodiment.
Figure 23:
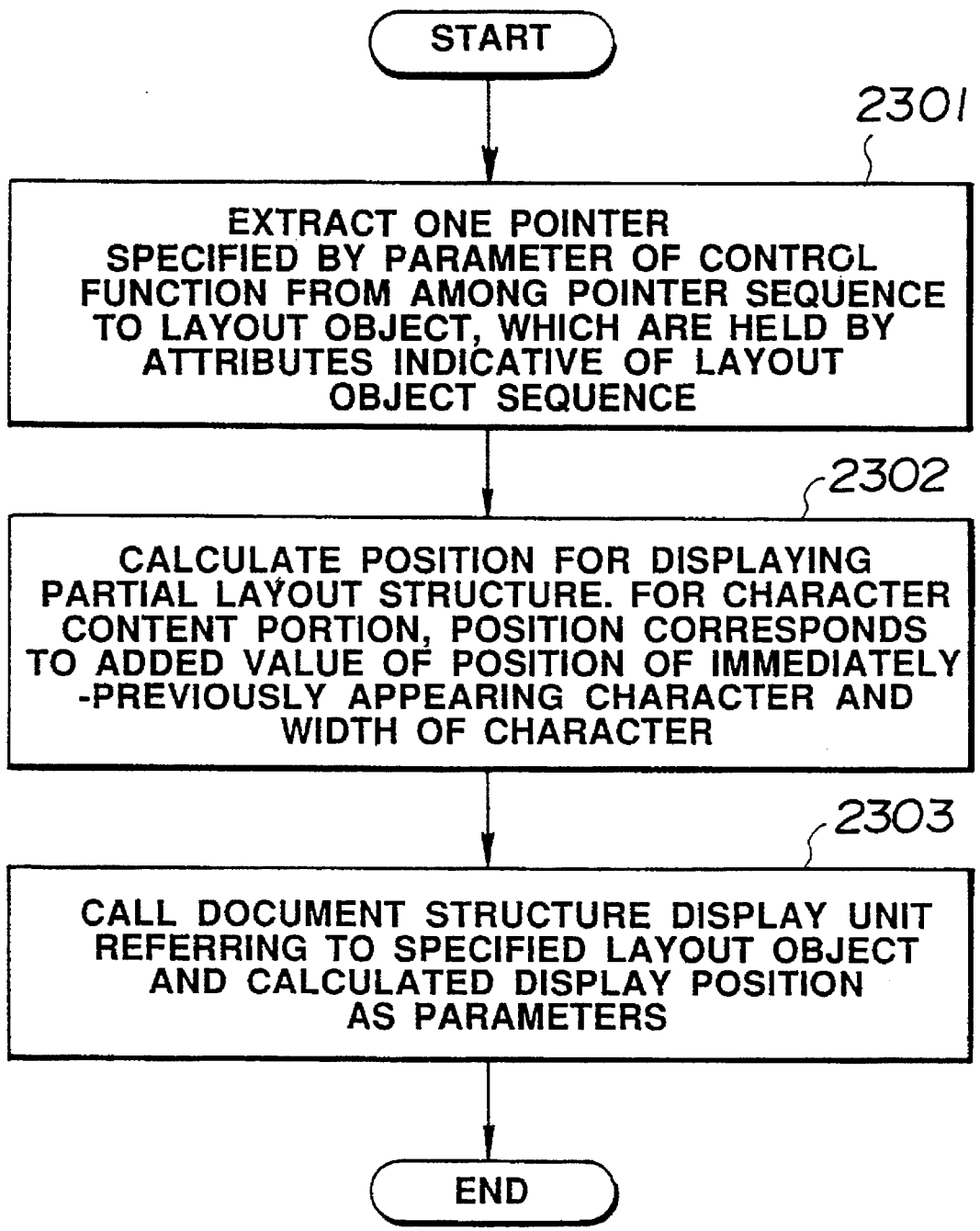
FIG. 23 is a flowchart for explaining the processing operation at the time of calling a document structure display unit from a content display unit in the third embodiment.

Next, a third embodiment of the present invention will be explained with reference to FIGS. 21 to 23.

Figure 21:
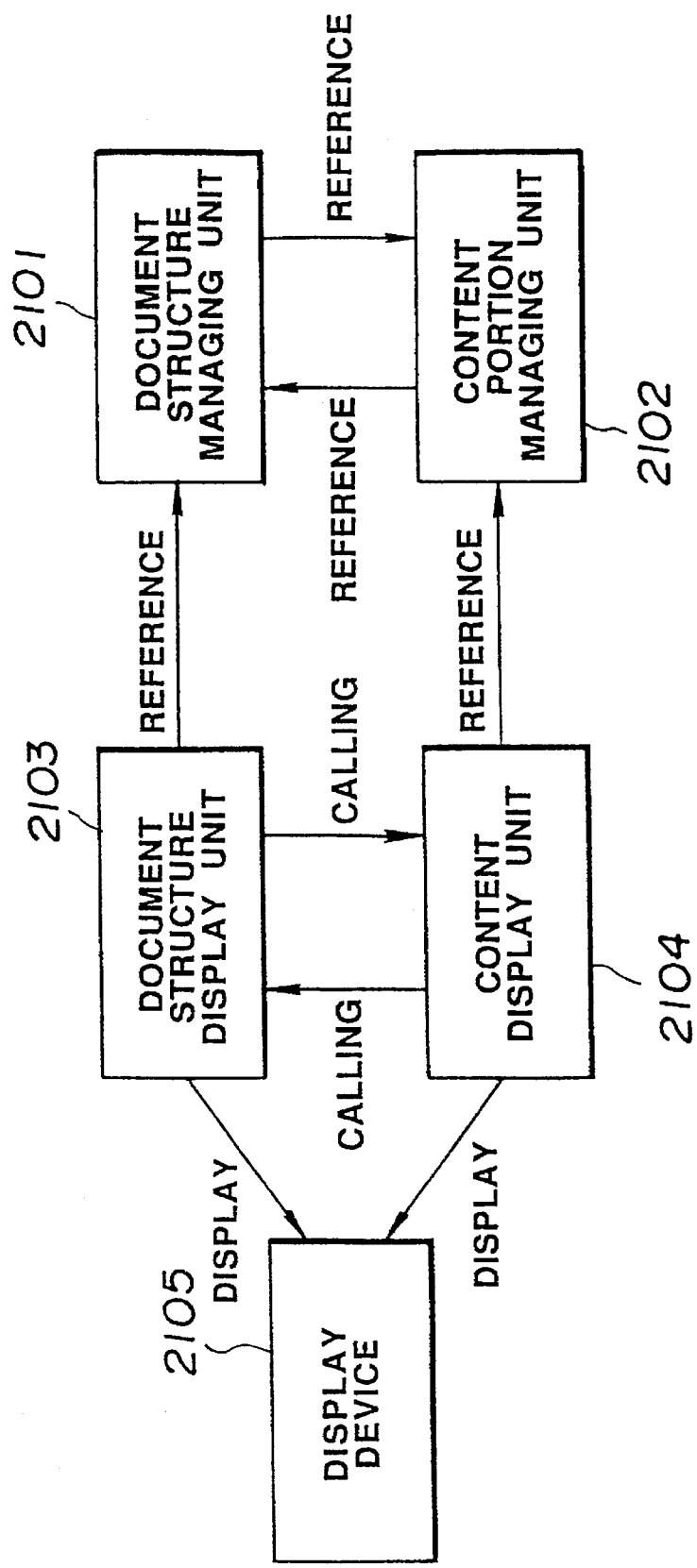
FIG. 21 is a functional block diagram of a document processing system in accordance with a third embodiment of the present invention.

FIG. 21 shows a functional block diagram of a document processing system in accordance with the third embodiment of the present invention.

In the drawing, the illustrated document processing system includes a document structure managing unit 2101, a content portion managing portion 2102, a document structure display unit 2103, a content display unit 2104, and a display unit 2105.

The document structure managing unit 2101 performs substantially the same function as the document structure managing unit 101 of FIG. 1, and the content portion managing unit 2102 performs substantially the same function as the content portion managing unit 102 of FIG. 1.

The document structure display unit 2103 sequentially processes layout objects in the layout structure being managed by the document structure managing unit 2101. In other words, the document structure display unit 2103 displays the layout objects and also calculates the position of the content portion to be displayed. However, the layout object to be actually displayed must have a boundary line (corresponding to an attribute "border" in the ODA). Further, the management of the display position is carried out based on the position (corresponding to an attribute "position" in the ODA) of the layout object. The document structure managing unit 2101, when finding a block, calls the content display unit 2104 with respect to its content portion.

The content display unit 2104 displays the content portion being managed in the content portion managing unit 2102 at the display position specified by the document structure display unit 2103.

The display unit 2105 displays the layout objects and content portion on the display screen.

The document structure managing unit 2101 and the content portion managing unit 2102 are realized in the form of such a memory as a hard disk or a main memory; while the document structure display unit 2103 and the content display unit 2104 are implemented by means of such a controller as a processor or a central processing unit which executes software (program) for performing the functions of these display and display units. The display and display units may be realized respectively in the form of hardware or firmware. Next, with the aforementioned arrangement, brief explanation will be directed to the content display processing of the content display unit 2104 of the document processing system by referring to a flowchart of FIG. 22.

The content display unit 2104 judges whether or not there is the next element in the content portion (step 2201). The absence of the next element causes the content display unit 2104 to terminate its processing: while the presence of the next element causes the content display unit 2104 to extract the next element (step 2202) and judge whether or not the element has an embedded partial layout structure (step 2203).

When determining at the step 2203 to be a partial layout structure, the content display unit 2104 calls the document structure display unit 2103 with respect to the embedded partial layout structure (step 2204) and requests the unit 2103 to perform its display processing.

On the other hand, when determining at the step 2203 not to be a partial layout structure, the content display unit 2104 performs the content display processing over the element. For example, the content display unit 2104 displays the element on the display unit 2105 (step 2205).

When completing either one of the steps 2204 and 2205, the content display unit 2104 returns to the step 2201 and performs the step 2201 and subsequent steps.

Explanation will next be made as to how the content display unit 2104 calls the document structure display unit 2103.

During the content display processing, when finding a control function of calling the layout object, the content display unit 2104 calls the document structure display unit 2103 (document structure processing function) with respect to the partial layout structure. The details of the calling will be explained by referring to a flowchart of FIG. 23.

The content display unit 2104 extracts one pointer specified by the parameter of the control function of calling the layout object from among the pointer sequence to the layout object, which are held by the attributes indicative of the layout object sequence (step 2301). Then the content display unit 2104 calculates the position (for example, the display position of a character for a text) of the partial layout structure to be displayed (step 2302). In the case of a character content portion, the display position corresponds to the position of the immediately previously appearing character added by the width of the character. Subsequently, the content display unit 2104 calls the document structure display unit 2103 (document structure display function) with use of the layout object specified at the step 2301 and of the display position calculated at the step 2302 as parameters (step 2303).

As has been explained in the foregoing, in accordance with the third invention, such layout processing can be realized that another medium is embedded in an embedded medium (for example, a mathematical formula is further embedded in a text within a graphic frame). Further, due to a document structure appearing in the middle, data (such as the layout of a boxed item), which would be hard to be expressed in terms of content portion, can be expressed.

Figure 24:
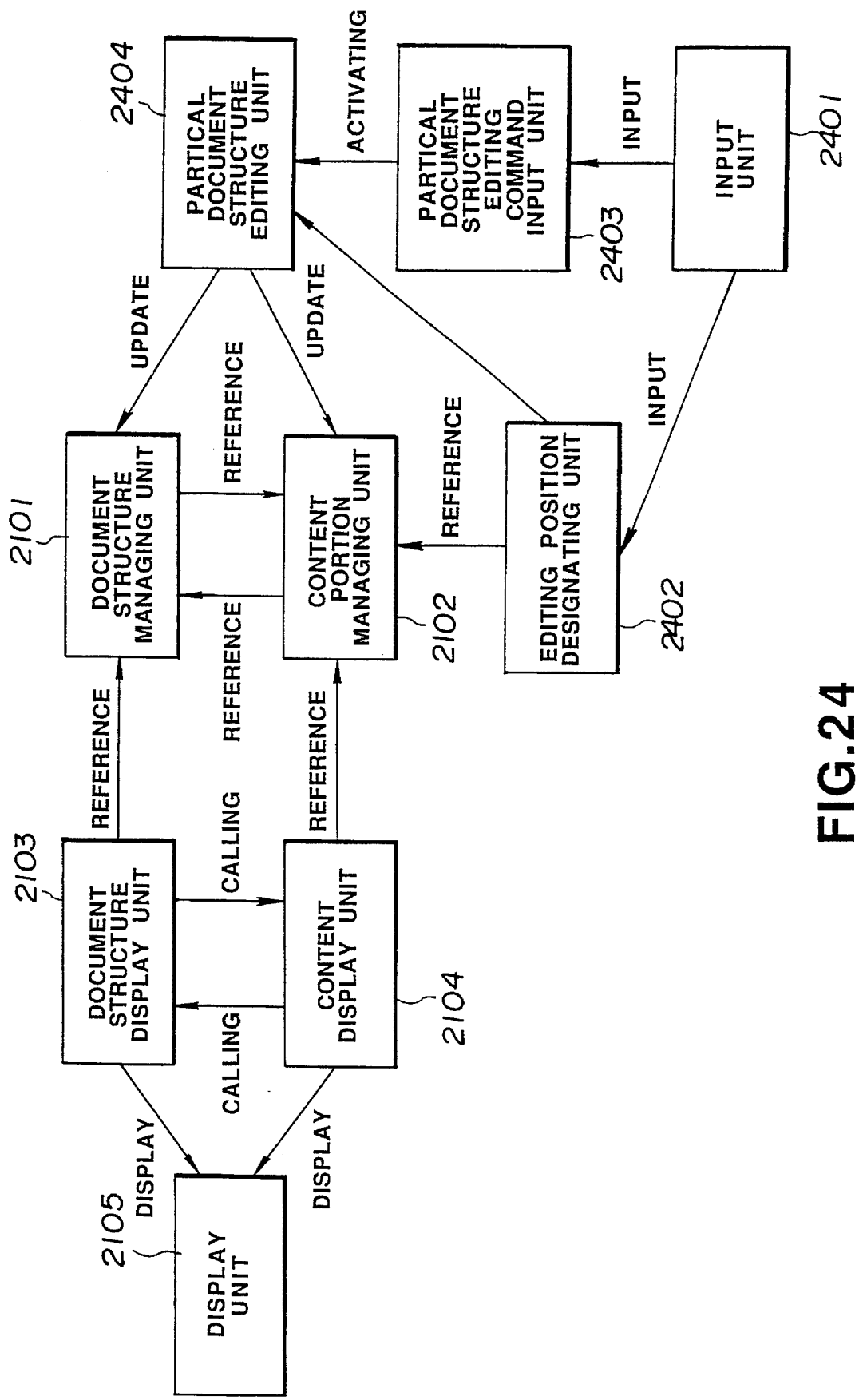
FIG. 24 is a functional block diagram of a document processing system in accordance with a fourth embodiment of the present invention.
Figure 25:
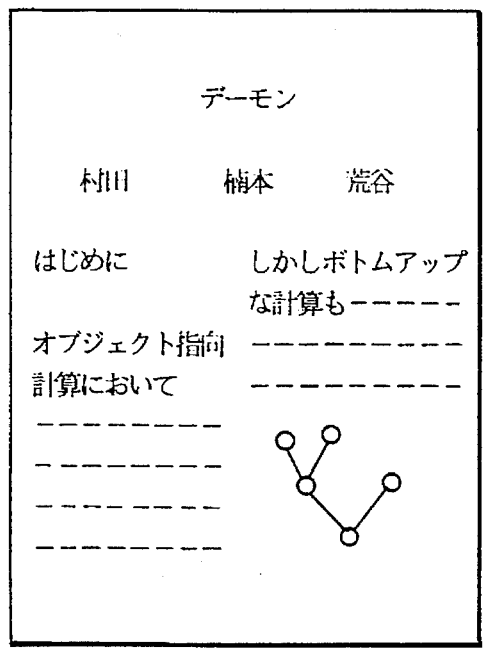
FIG. 25 shows an example of document used when a conventional layout processing is explained.
Figure 26:
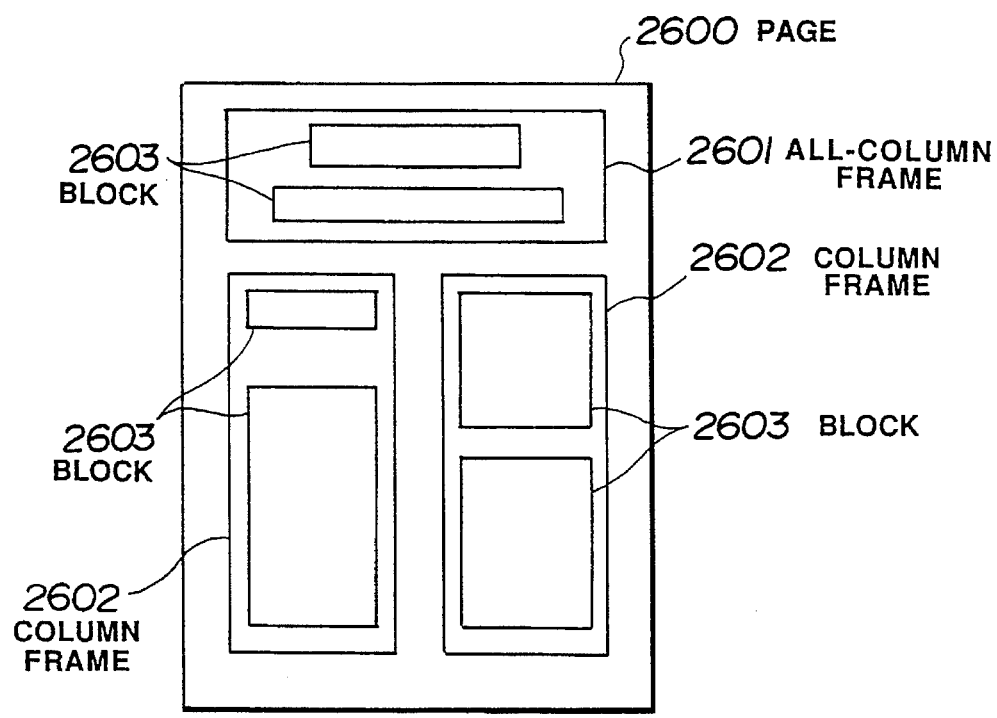
FIG. 26 shows layout structures in the document shown in FIG. 25.
Figure 27:
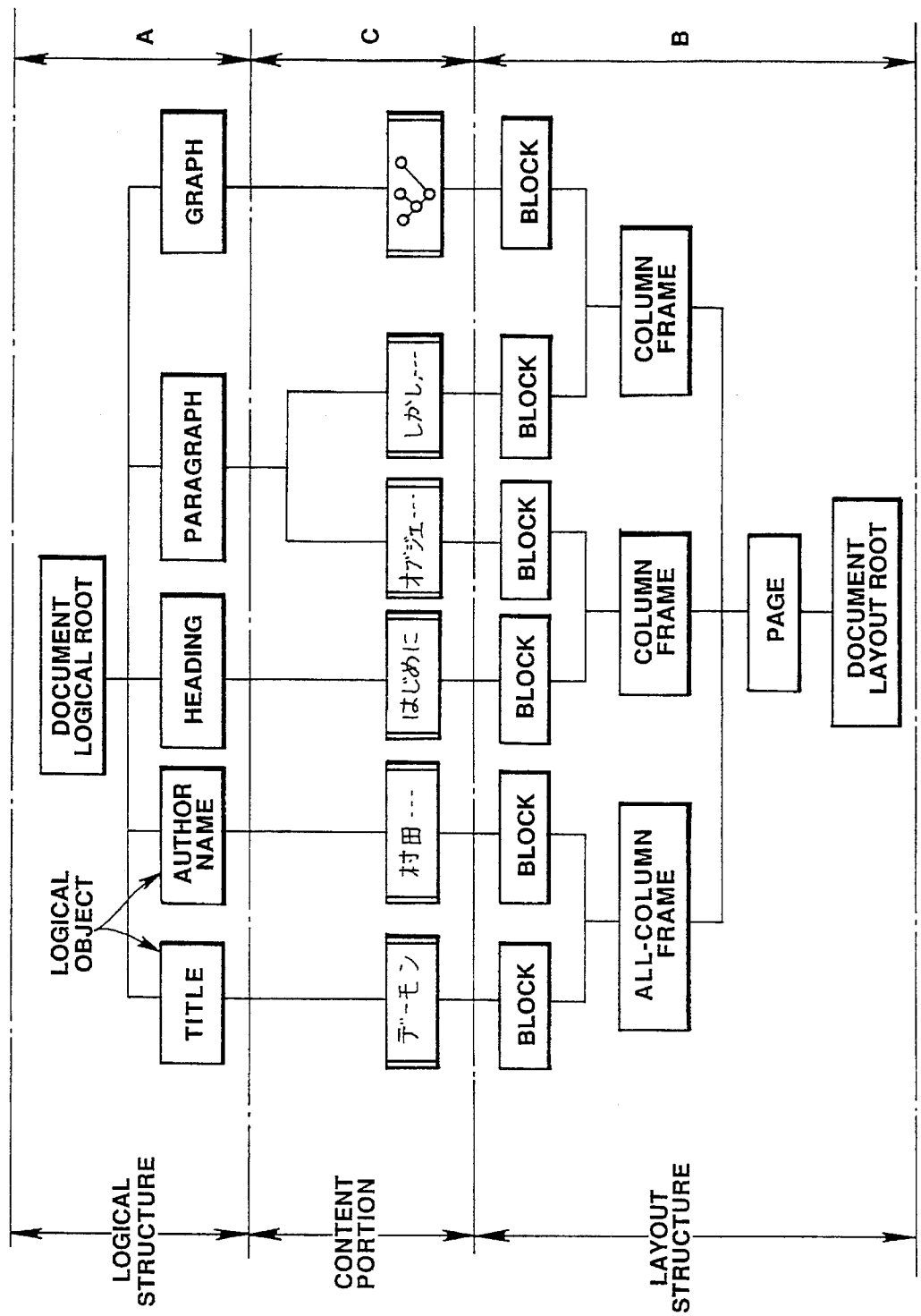
FIG. 27 is a diagram showing a relationship between logical and layout structures in the document of FIG. 25.
Figure 28:
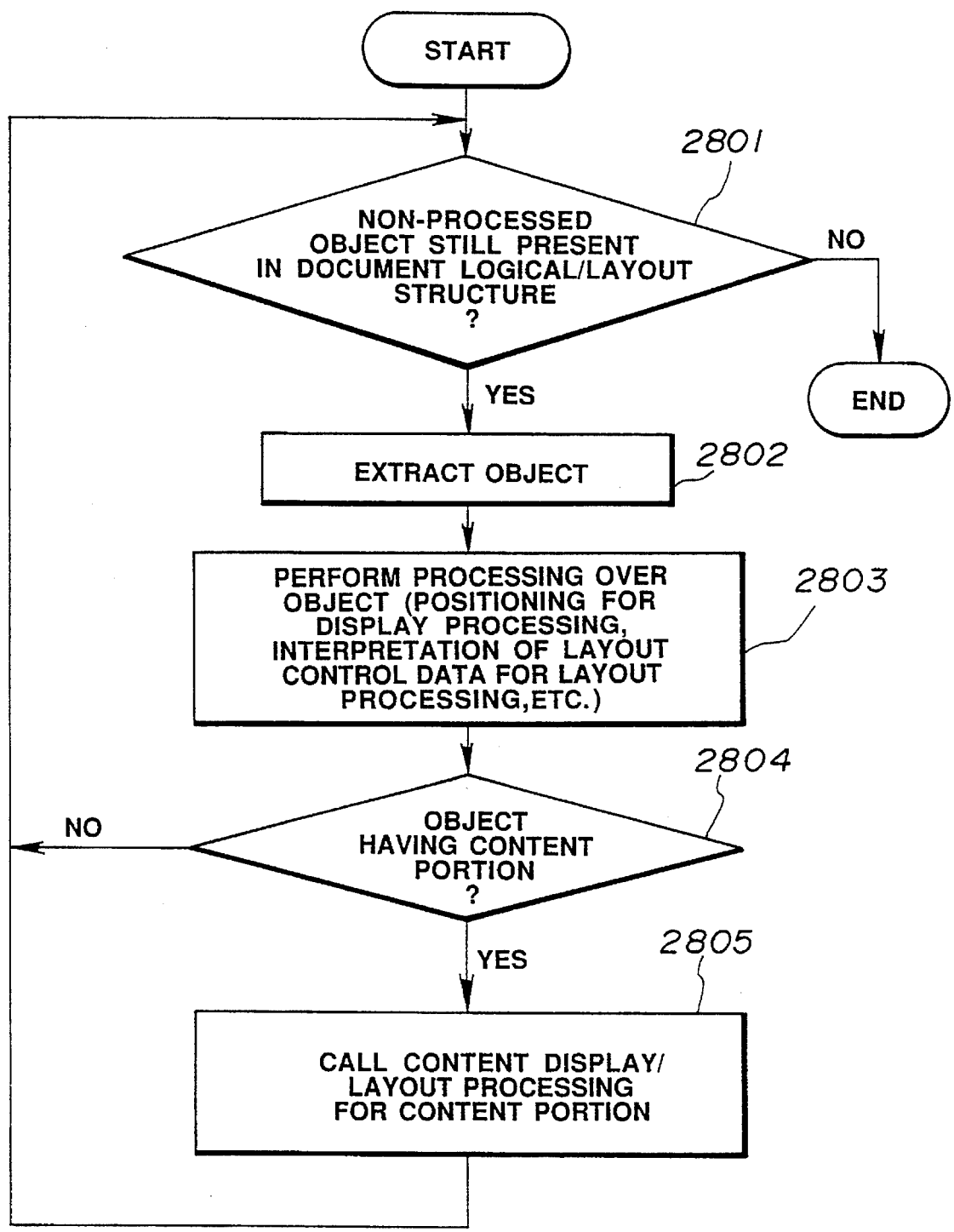
FIG. 28 is a flowchart for explaining the operation of conventional document structure display and layout processing.
Figure 29:
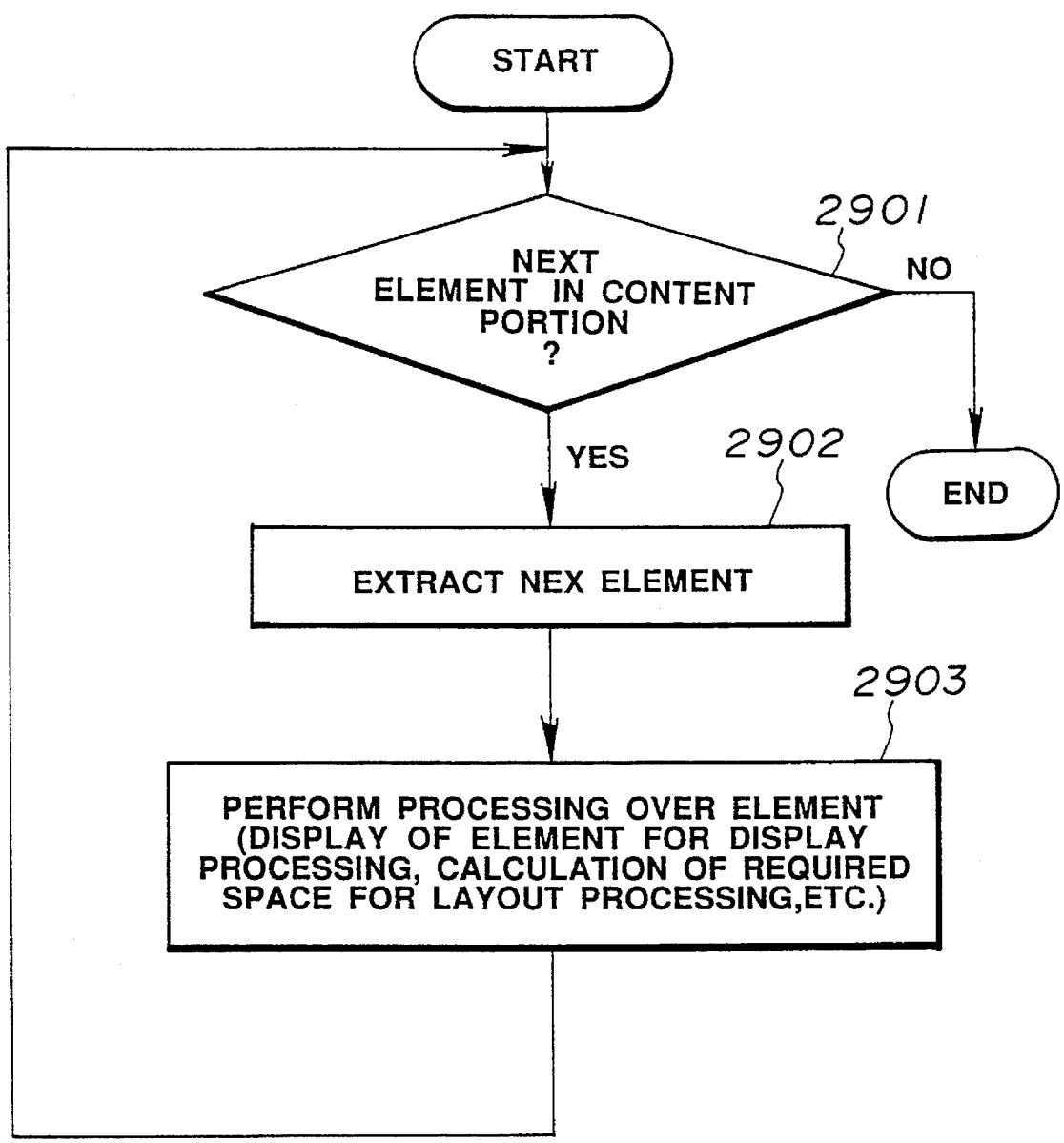
FIG. 29 is a flowchart for explaining the operation of conventional document structure display and layout processing.
Figure 33:
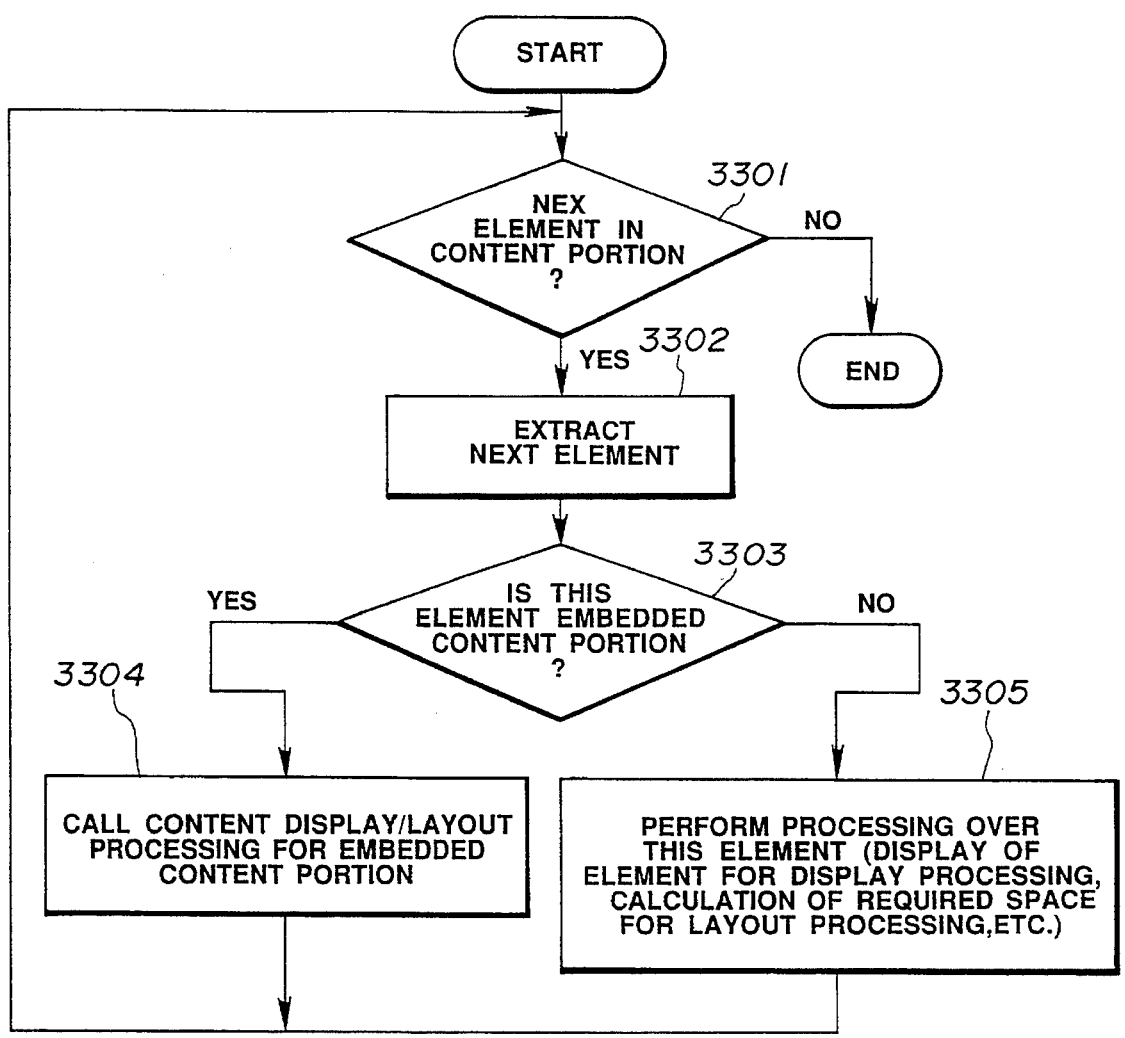
FIG. 33 is a flowchart for explaining the operation of conventional document structure display and layout processing.

Next, a fourth embodiment of the present invention will be explained with reference to FIG. 24. FIG. 24 shows a functional block diagram of a document processing system in accordance with the fourth embodiment of the present invention. The functional block diagram of FIG. 24 corresponds to the functional block diagram of the third embodiment of FIG. 21 but an input unit 2401, an editing position designator 2402, a partial document structure editing command input unit 2403 and a document partial structure editor 2404 are newly added.

The input unit 2401, which comprises a mouse, a keyboard or the like, designates one point (desired position) of the content portion displayed on the display unit 2105 through the content display unit 2104 or enters such an editing command such as insert, copy, delete or move therethrough. The editing position designator 2402, on the basis of positional data indicative of the desired position designated by the input unit 2401, specifies one part of the content portion to be edited by making reference to the data within the content portion managing unit 2102 and informs the partial document structure editor 2404 of the specified position. The partial document structure editing command input unit 2403 informs the partial document structure editor 2404 of the editing command entered through the input unit 2401. The partial document structure editor 2404, on the basis of the editing command informed from the partial document structure editing command input unit 2408, performs its editing operation over the content of the position informed from the editing position designator 2402. At this time, the data within the content portion managing unit 2102 and the data within the document structure managing unit 2101 are updated.

In the present embodiment, the editing position designator 2402, the partial document structure editing command input unit 2403, and the partial document structure editor 2404 are realized by means of such a controller as a processor or a central processing unit which executes software (programs) for effecting the respective functions of the above units. The above units may be realized respectively in the form of hardware or firmware.

Explanation will then be made as to the changing operation of the partial document structure based on the editing command issued from the partial document structure editor 2404.

The partial document structure editor 2404 performs such operation as insert, copy, delete or move over the partial document structure according to the editing command received from the partial document structure editing command input unit 2043. More specifically, the partial document structure editor 2404 adds or deletes an object to or from the attribute (content portion attribute) indicative of the embedded object sequence and inserts or deletes a control function (appearing in the content portion) of calling an object into or from the content portion. When such editing operation is carried out on such a document editor as a WYSIWYG (what you see is what you get), immediately after the partial document structure is changed, the document layout function (document layout unit) and the document displaying function (document display unit) are activated.

As has been explained in the foregoing, in accordance with the fourth embodiment, the content portion having an embedded medium in which another medium is further embedded can be edited.

As mentioned above, in accordance with the present invention, when it is desired to perform layout processing over the document structure within the content portion holding reference data to the document structure, the content layout unit calls the document structure layout unit to embed the document structure layouted by the called document structure layout unit into the content portion. As a result, the embedding of the document structure into the content portion can be realized and a general form of medium embedding, that is, substantially the same operation as the layout processing of the document logical structure can be realized.

Further, when it is desired to perform display processing over the document structure within the content portion holding the reference data to the document structure, the content display unit calls the document structure display unit to display the document structure to the displayed by the document structure display unit. As a result, the embedded state of the document structure into the content portion can be displayed and a general form of medium embedding, that is, substantially the same operation as the display processing of the document logical structure can be realized.

From the foregoing, there can be provided a document processing system which can realize the systematical medium embedding and the combined medium embedding and also can improve the processing efficiency of the layout and display processing.

The present invention can be modified in various ways without departing from the spirit and subject matter of the invention. Therefore, it should be appreciated that the present invention is not intended to limit the invention to the foregoing exemplary embodiments. That is, the invention is restricted not by the body of the specification but only by the scope of the attached claims. The invention includes all alternatives, modifications and equivalent arrangements covered by the scope of the appended claims.

What is claimed is:

1. A document processing system comprising:

document structure managing means for managing a document structure;

content portion managing means for managing a content portion including one or more constituent elements of a document, each of the constituent elements includes reference data to a particular document structure when a constituent element of a different type from the each of the constituent elements is to be placed in the each of the constituent elements, the particular document structure corresponding to the constituent element of the different type;

document structure layout means for performing a layout of the document structure; and content layout means for performing a layout of the content portion, wherein each time the content layout means detects the reference data at the time of performing a layout of the content portion, the content layout means causes the document structure layout means to perform a layout of the document structure for the constituent element of the different type corresponding to the reference data.

2. A document processing system as set forth in claim 1, wherein the reference data includes attribute data for indicating a sequence of logical objects of the document structure, and control function data for indicating a logical object in the sequence.

3. A document processing system as set forth in claim 2, wherein in accordance with the control function data for indicating the logical object, the content layout means causes the document structure layout means to perform a layout of the document structure.

4. A document processing system as set forth in claim 1, wherein the document structure layout means executes a layout of the document structure with use of a layout template indicative of a way to perform a layout o the document structure.

5. A document processing system comprising:

document structure managing means for managing a document structure;

content portion managing means for managing a content portion including one or more constituent elements of a document, each of the constituent elements includes reference data to a particular document structure when a constituent element of a different type from the each of the constituent elements is to be placed in the each of the constituent elements, the particular document structure corresponding to the constituent element of the different type;

document structure display means for displaying the document structure; and content display means for displaying the content portion, wherein each time the content display means detects the reference data at the time of displaying the content portion, the content display means causes the document structure display means to display the document structure for the document element of the difference type corresponding to the reference data.

6. A document processing system as set forth in claim 5, wherein the reference data includes attribute data for indicating a first sequence of logical objects and a second sequence of layout objects, first control function data for indicating a logical object in the first sequence, and second control function data for indicating a layout object in the second sequence.

7. A document processing system as set forth in claim 6, wherein in accordance with the control function data for indicating the layout object, the content display means causes the document structure display means to display the partial layout structure.

8. A document processing system as set forth in claim 5, wherein when a constituent element of the content portion includes the reference data indicating a partial layout structure, the content display means causes the document structure display means to display the partial layout structure.

9. A document processing system comprising:

document structure managing means for managing a document structure;

content portion managing means for managing a content portion including one or more constituent elements of a document, each of the constituent elements includes reference data to a particular document structure when a constituent element of a different type of the each of the constituent elements is to be placed in the each of the constituent elements, the particular document structure corresponding to the constituent element of the different type;

document structure display means for displaying the document structure;

content display means for displaying the content portion;

a display unit for displaying on display screen of the display unit the document structure to be displayed by the document structure display unit and the content portion to be displayed by the content display means;

input means for designating a position in the content portion displayed on the display unit and for inputting an editing command; and partial document structure editing means for editing a content of the position inputted by the input means in accordance with the command inputted from the input means and also for updating data of the document structure managing means and data of the content portion managing means in accordance with an edited result, wherein each time the content display means detects the reference data at the time of displaying the content portion, the content display means causes the document structure display means to display the document structure for the document element of the different type corresponding to the reference data.

* * * * *